United States Patent
Watanabe et al.

(10) Patent No.: US 6,521,157 B2
(45) Date of Patent: Feb. 18, 2003

(54) METHOD FOR FABRICATING PRESS FORMING DIE AND METHOD FOR FABRICATING PRESS FORMING PUNCH

(75) Inventors: Teiji Watanabe, Hamamatsu (JP); Masafumi Nakamura, Hamamatsu (JP); Yoshikazu Nakamura, Hamamatsu (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 145 days.

(21) Appl. No.: 09/741,554

(22) Filed: Dec. 19, 2000

(65) Prior Publication Data

US 2001/0004003 A1 Jun. 21, 2001

(30) Foreign Application Priority Data

Dec. 20, 1999 (JP) .............................. 11-361716
Jan. 31, 2000 (JP) ...................... 2000-023047

(51) Int. Cl.⁷ .............................................. B29C 33/38
(52) U.S. Cl. ...................... 264/225; 264/299; 264/313; 264/320; 264/219; 264/220; 156/212
(58) Field of Search ................................ 264/219, 259, 264/294, 299, 313, 320, 220, 225, 226; 156/212, 214

(56) References Cited

U.S. PATENT DOCUMENTS 3,955,266 A * 5/1976 Honami et al. .............. 164/7.2

OTHER PUBLICATIONS

Specification of Application No.: 09/783357.
Specification of Application No.: 09/782846.

\* cited by examiner

*Primary Examiner*—Michael W. Ball
*Assistant Examiner*—Barbara J Musser
(74) *Attorney, Agent, or Firm*—Merchant & Gould, P.C.

(57) ABSTRACT

A press forming die is fabricated by initially fabricating a die forming panel, by press forming, which provides a die surface for the press forming die. During fabricating the die forming panel, a shaped panel is obtained by initially press forming a first blank material with a die forming prototype and a punch forming prototype. Next, the shaped panel is mounted onto the punch forming prototype again and, thereafter, a die forming panel is obtained by press forming a second blank material. The die forming panel is then mounted on a frame body and a backup material is formed between a space between the frame body and the die forming panel, thereby fabricating the press forming die. Since the die surface of the press forming die can be shaped by press forming, the press forming die can be simply fabricated.

4 Claims, 17 Drawing Sheets

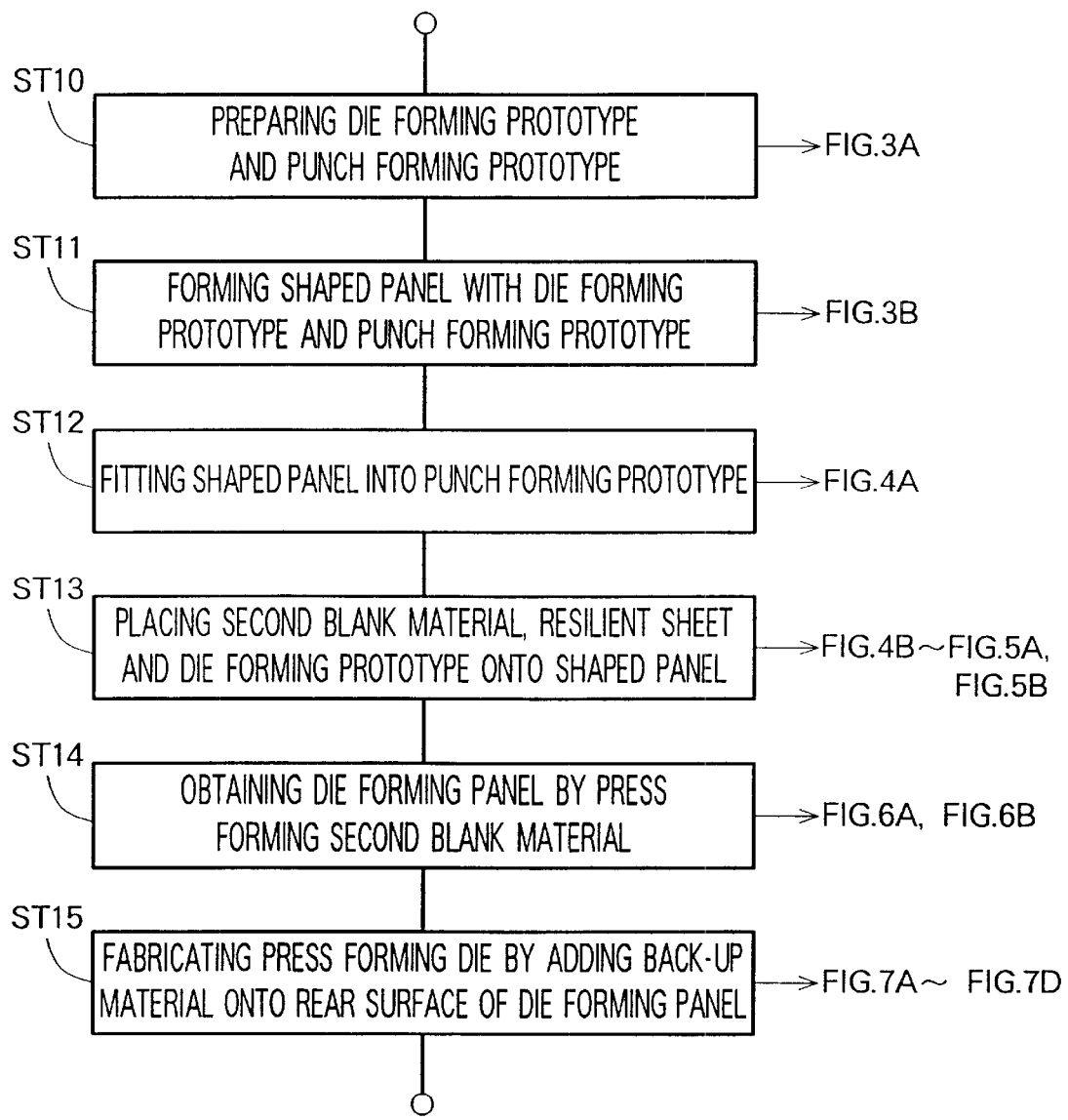

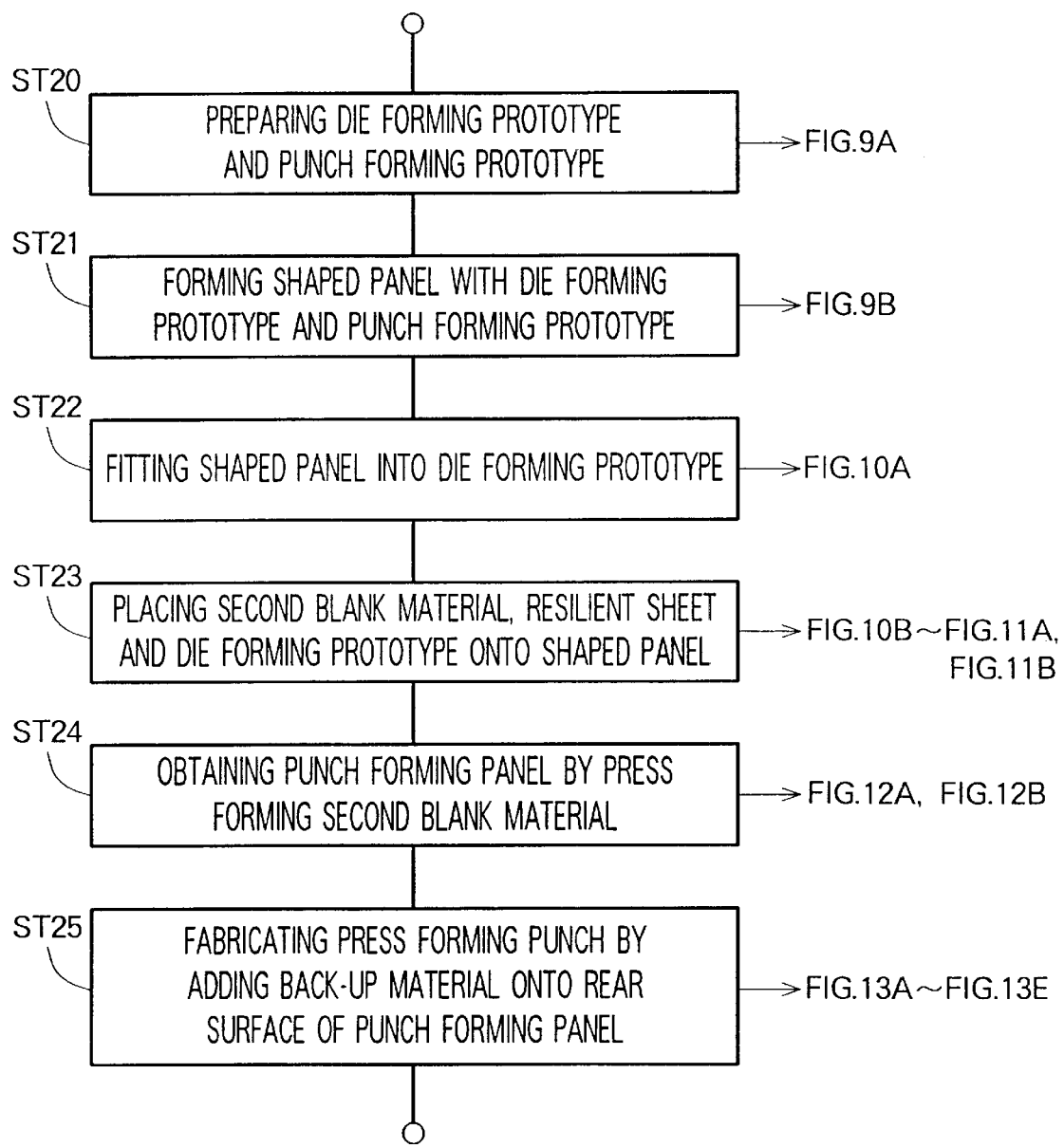

METHOD FOR FABRICATING PRESS FORMING DIE AND METHOD FOR FABRICATING PRESS FORMING PUNCH

BACKGROUND OF THE INVENTION

1. Field of the Invention

The present invention relates to a method for fabricating a press forming die, a method for fabricating a press forming punch, and a press forming die assembly, which die, punch and assembly are suitable for press forming a blank material into a product panel.

2. Description of the Related Art

Many of component parts such as a fuel tank of a two-wheeled vehicle are fabricated chiefly by press forming with the use of a press forming die assembly, which is generally formed of alloy steel shaped by precision work. The press forming die assembly of this type is advantageous in that it has great durability. As a result, even if the cost of the press forming die assembly is extremely high, it is possible to collect the cost by mass production.

Since, however, model changes in modern two-wheeled vehicles tend to be carried out in a relatively short cycle time and the mass production is inclined to a smaller-volume production with many kinds. If the press forming die assembly made of alloy steel is employed in smaller-volume production with many kinds, it is difficult to collect the die costs and to restrain the cost hike of the products.

To solve this problem, press forming die assemblies made of plastic (hereinafter referred to as plastic type press forming die assemblies) are widely used for the smaller-volume production with the many kinds. Since the plastic type press forming die assembly can be simply fabricated, the cost of the plastic die assembly is lower than that the press forming die assembly of the alloy steel type. As a result, even when the model changes of the two-wheeled vehicles are frequently made in the short cycle time, it is easy to pay off and the cost up of the products can be restrained. However, since the plastic type die assembly has a die surface softer than the alloy type die assembly, the die surface of the plastic type die assembly is easy to wear. When this occurs, it is difficult to maintain the accuracy of the press formed products. Accordingly, in order to maintain the press formed products at a high accuracy, replacements of the plastic type die assemblies are frequently required.

For this reason, the old plastic type die assembly should be replaced with new one within a relatively short working cycle, resulting in a difficult collection of the die costs.

Further, it has been proposed to employ zinc alloy steel (for example, ZAS) for press forming die assemblies to reduce the die costs. Since a principal ingredient of ZAS is zinc, it melts at a low temperature of, for example, about 300° C. Consequently, it is possible to reduce the die costs of the die assembly of the ZAS type.

Since, however, the ZAS type die assembly also has a relatively soft die surface, the die surface of the ZAS type die assembly has a lower wear resistant property than the alloy steel type die assembly. For this reason, the old ZAS type die assembly should also be frequently replaced with a new one in a relatively short cycle time, resulting in a difficult collection of the die costs.

It is therefore desired to provide a new type of press forming die assembly that is enabled to restrain the die costs while having prolonged durability close to that of the alloy steel type die assembly.

SUMMARY OF THE INVENTION

It is therefore an object of the present invention to provide a method of fabricating a press forming die, a method of fabricating a press forming punch, and a press forming die assembly, which are low in die costs and have prolonged durability.

According to one aspect of the present invention, there is provided a method of fabricating a press forming die which comprises the steps of preparing a die forming prototype and a punch forming prototype, press forming a first blank material with the die forming prototype and the punch forming prototype to obtain a shaped panel, fitting the shaped panel into the punch forming prototype again, placing a second blank material, a resilient sheet and the die forming prototype over the shaped panel fitted to the punch forming prototype in a sequential order, moving the die forming prototype toward the punch forming prototype relative to one another and stopping the die forming prototype at a position ahead of a bottom dead center of a press forming machine by a given distance for thereby press forming the second blank material with the shaped panel to obtain a die forming panel, and adding a backup material onto a rear surface of the die forming panel to fabricate the press forming die.

In the above fabrication process, a shaped panel is fabricated by press forming with the die forming prototype and the punch forming prototype, with the shaped panel being further press formed with the punch forming prototype into the die forming panel. The die forming panel is utilized as the die surface of the press forming die. Since, in this event, the die surface of the press forming die can be simply fabricated by press forming work, it is unnecessary to shape the die surface of the press forming die by cutting work with the use of an NC machining center or by profiling with a profiling machine. Accordingly, the press forming die can be fabricated in a simple manner, with a resultant decrease in the die costs. Also, the die surface of the press forming die may be formed by a metal surface having a strong hardness such as high tension steel or stainless steel. In addition, during press forming the die forming panel, the die forming panel may be subjected to a suitable hardening treatment. Consequently, the surface hardness of the die forming panel may be easily hardened to a higher level in the above fashion, thereby increasing the durability of the die surface of the press forming die.

In the preferred method discussed above, the fabrication process may further include, after the step of obtaining the die forming panel, a step of mounting the die forming panel onto a frame body, and a step of filling a high strength cement into a space between the frame body and the die forming panel. The high strength cement is hardened and, therefore, the press forming die can have a highly improved durability.

According to another aspect of the present invention, there is provided a method of fabricating a press forming punch which comprises the steps o f preparing a die forming prototype and a punch forming prototype, press forming a first blank material with the die forming prototype and the punch forming prototype to obtain a shaped panel, fitting the shaped panel into the die forming prototype again; placing a second blank material, a resilient sheet and the prototype punch over the shaped panel fitted to the die forming prototype in a sequential order, moving the punch forming prototype toward the die forming prototype relative to one another and stopping the punch forming prototype at a position ahead of a bottom dead center of a press forming machine by a given distance for thereby press forming the second blank material with the shaped panel to obtain a punch forming panel, and adding a backup material onto a rear surface of the punch forming panel to fabricate the press forming punch.

In the above fabrication process, a shaped panel is fabricated by press forming with the die forming prototype and the punch forming prototype, with the shaped panel being further press formed with the die forming prototype into the punch forming panel. The punch forming panel is utilized as the die surface of the press forming punch. Since, in this event, the die surface of the press forming punch can be simply fabricated by press forming work, it is unnecessary to shape the die surface of the press forming punch by cutting work with the use of an NC machining center or by profiling with a profiling machine. Accordingly, the press forming punch can be fabricated in a simple manner, with a resultant decrease in the die costs. Also, the die surface of the press forming punch may be formed by a metal surface having a strong hardness such as high tension steel or stainless steel. In addition, during press forming the punch forming panel, the punch forming panel may be subjected to a suitable hardening treatment. Consequently, the surface hardness of the punch forming panel may be easily hardened to a higher level in the above fashion, thereby increasing the durability of the die surface of the press forming punch.

According to the second aspect of the invention, the fabrication process may further include, after the step of obtaining the press forming panel, a step of mounting the press forming panel onto a frame body, and a step of filling a high strength cement into a space between the frame body and the press forming panel. The high strength cement is hardened and, therefore, the press forming punch has the backup material that is discussed above.

According to a third aspect of the present invention, there is provided a press forming die assembly which comprises a press forming die, and a press forming punch, each of the press forming die and the press forming punch including a panel for the die assembly that is shaped by press forming a blank material, a frame body mounting thereon the panel, and a backup material filled between a space between the frame body and the panel and composed of either one of cement or plastic.

In accordance with the press forming die assembly, since a die forming panel is fabricated by press forming, the die forming panel can be fabricated with a metal having a strong surface hardness such as high tension steel or stainless steel. Consequently, the die forming panel may be utilized as a die surface of the press forming die, thereby increasing the durability of the die surface of the press forming die. Also, since the backup material for the die forming panel is formed of cement or plastic, it is possible to reduce the die costs.

BRIEF DESCRIPTION OF THE DRAWINGS

Certain preferred embodiments of the present invention will be described in more detail below, by way of example only, with reference to the accompanying drawings in which:

FIG. 2 is a flow chart illustrating a first preferred embodiment of a fabrication method of the die assembly shown in FIG. 1;

FIG. 8 is a flowchart illustrating a first preferred embodiment of a fabricating process for a press forming punch shown in FIG. 1;

DETAILED DESCRIPTION OF THE PREFERRED EMBODIMENTS

Figure 1:
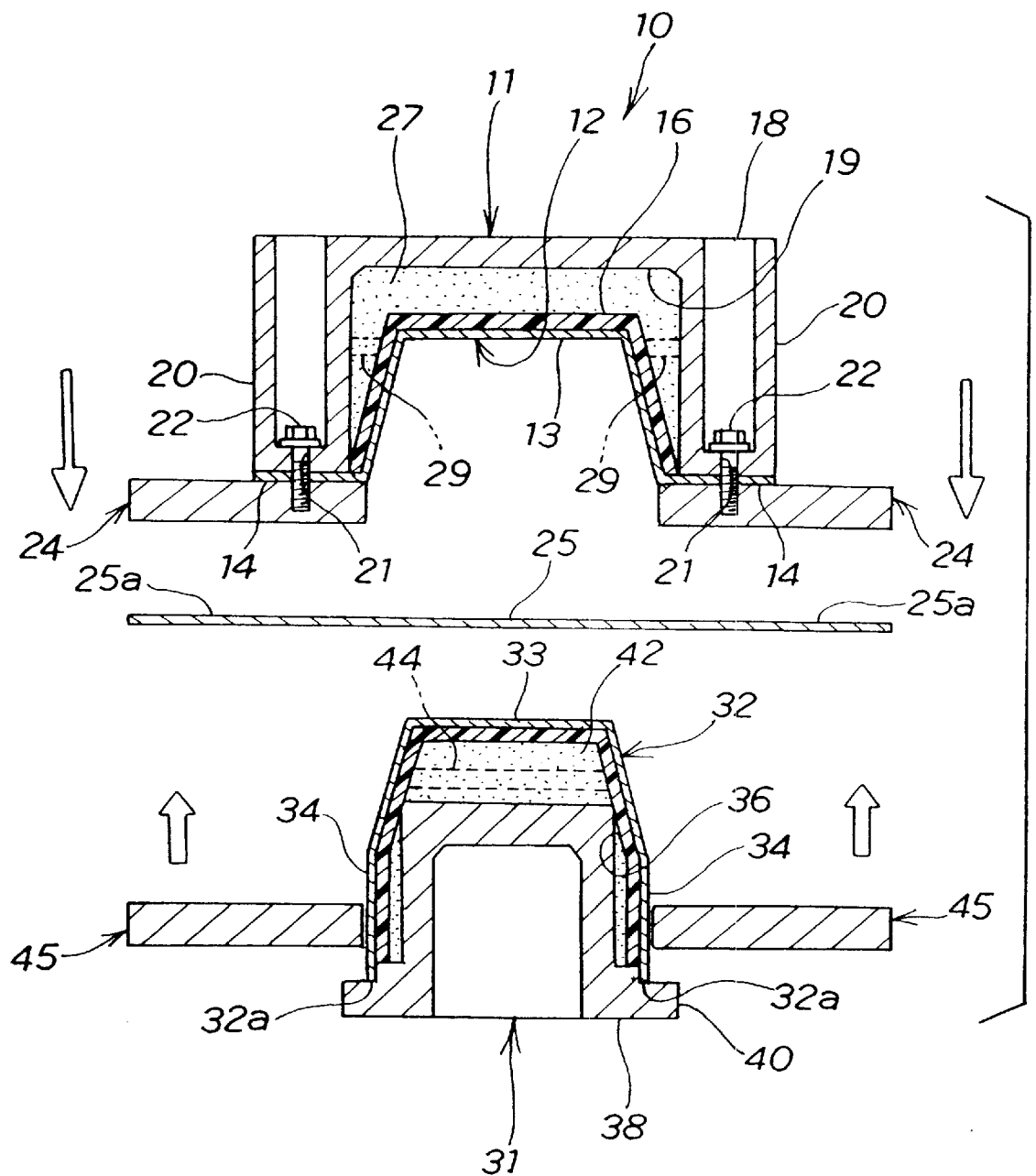
FIG. 1 is a cross sectional view of a press forming die assembly according to the present invention.

Referring now to FIG. 1, there is shown a press forming die assembly 10 according to a preferred embodiment of the present invention. The press forming die assembly 10 includes a press forming die 11 that vertically moveable between a top dead center (TDC) and a bottom dead center (BDC) of a press forming machine (not shown), a press forming punch 31 located below the press forming die 11, and blank holders 45, 45 located at both sides of the press forming punch 31 and vertically moveable toward and away from the press forming die 11.

The press forming die 11 includes a die forming panel (that is, die panel) 12 made of a thin metallic sheet such as, for example, a high tension steel or stainless steel sheet (namely, with a thickness of 0.02 mm), a backup lining 16 lined on the entire surface at a rear side of the die forming panel 12, a frame body 18 on which the die forming panel 12 is mounted, die face members 24, 24 secured to a bottom wall of the frame body 18 to firmly retain the die forming panel 12 thereto, and a backup material 27 (such as high strength cement) that is filled in a space between the frame body 18 and the backup lining 16 (that is, the die forming panel 12).

A center portion of the die forming panel 12 has a substantially upwardly indented trapezoid, concave die surface 13 that has left and right sides formed with left and right transversely extending flanges 14, 14, respectively. The flanges 14, 14 are sandwiched between the bottom end of the frame body 18 and the die face members 24, 24.

The backup lining 16 is made by, for example, forming a paste like material composed of a mixture of epoxy plastic and glass fibers wherein bubbles are completely removed, applying the paste like material to a rear surface of the die forming panel 12 and subsequently hardening the paste like material by some known suitable means. With the use of the backup lining 16, the die forming panel 12 can be reinforced in structure. Since, further, the backup lining 16 has a rough surface, the backup lining 16 is strongly cohesive to the cement (that is, the high strength cement) filled in the prescribed space.

The frame body 18 includes a channel shaped body formed with an upwardly and inwardly indent central cavity 19 for accommodating therein the die forming panel 12, which body has a pair of vertically extending left and right legs 20, 20. The left and right legs 20, 20 have bottom walls having insertion holes 21, 21 through which threaded bolts 22, 22 extend.

The die face members 24, 24 are fixedly secured to the bottom wall of the frame body 18 by means of the threaded bolts 22, 22, thereby firmly retaining flanges 14, 14 of the die forming panel 12. The die face members 24, 24 serves to retain left and right distal ends 25a, 25a of a blank sheet material 25 during press forming a product panel.

The backup material 27 is formed by filling the high strength cement in a slurry form into the space between the frame body 18 and the backup lining 16 and subsequently hardening the same, thereby supporting the die forming panel 12 at its rear side. It is to be noted here that the high strength cement may be replaced with plastic. In this event, the plastic may be filled in a melted condition into the space between the frame body 18 and the backup lining 16 (namely, the die forming panel 12) and hardened to form the backup material 27. Stems 29, 29 transversely extend between vertical inner walls of the central cavity 19 and adjacent slanted walls of the die forming panel 12 to reinforce the same while enabling slight dimensional adjustments of the die forming panel 12 relative to the frame body 18.

The press forming punch 31 includes an upwardly extending press forming panel (namely, a punch forming panel) 32 shaped by press forming, for example, a high tension steel or stainless sheet (namely, with a thickness of 0.02 mm), a backup lining 36 lined on a rear wall of the punch forming panel 32, a frame body 38 for mounting the punch forming panel 32, and a backup material 42 such as a high strength cement that is filled in a space between the backup lining 36 (that is, the punch forming 32) and the frame body 38.

The press forming panel 32 has a substantially upwardly extending trapezoid, convex die surface 33 substantially complementary to the concave die surface 13 of the press forming die 11, and has left and right downwardly extending vertical walls 34, 34 contiguous with left and right lower ends of the punch forming panel 32.

The backup lining 36 is made by, for example, forming a paste like material composed of a mixture of epoxy plastic and glass fibers wherein bubbles are completely removed, applying the paste like material to a rear surface of the punch forming panel 32 and subsequently hardening the paste like material by some known suitable means. With the use of the backup lining 36, the punch forming panel 32 can be reinforced in structure. Since, further, the backup lining 36 has a rough surface, the backup lining 36 is strongly cohesive to the cement (that is, the high strength cement) filled in the prescribed space.

The frame body 38 is accommodated in an upwardly extending cavity of the punch forming panel 32 and has at its bottom end formed with flanges 40, 40 against which lower distal ends 32a, 32a of the vertical walls 34, 34 of the punch forming panel 32.

The backup material 42 is formed, in the same manner as the backup material 27, by filling the high strength cement in a slurry form into the space between the frame body 38 and the backup lining 36 and subsequently hardening the same, thereby supporting the punch forming panel 32 at its rear side. It is to be noted here that the high strength cement may be replaced with plastic. In this event, the plastic may be filled in a melted condition into the space between the frame body 38 and the backup lining 36 (namely, the punch forming panel 32) and hardened to form the backup material 42. Stems 44, 44 transversely extend between slanted walls of the punch forming panel 32 to reinforce the same while enabling slight dimensional adjustments of the punch forming panel 32 relative to the press forming die 11.

The blank holders 45, 45 are located below the die face members 24, 24 of the press forming die 11 in parallel relationship, and are vertically moveable upward or downward such that the blank holders 45, 45 and the die face members 24, 24 selectively retain the left and right distal ends 25a, 25a of the blank sheet material 25. As a result, the blank sheet material 25 is stretched with a desired force during press forming operation, thereby preventing warping or undesirable deformation.

According to the press forming die assembly 10, since the die forming panels (namely, the die forming panel 12 and the punch forming panel 32) are fabricated by a press forming process, the die forming panels can be made of a metallic sheet such as, for example, a highly tensioned steel or stainless steel having a hard surface. Accordingly, the press forming die 11 and the press forming punch 31 (namely, the die forming panel 12 and the punch forming panel 32) have die surfaces having a highly improved wear-proof and long durability. As a result, it is possible to obtain the press forming die 11 and the press forming punch 31 which have a long durability.

Since, also, the backup materials 27, 42 that support the die forming panel 12 and the punch forming panel 32 can be made of relatively low cost cement or plastic, the die assembly 10 can be fabricated in an extremely low cost.

Now, a method of press forming a blank material 25 with the use of the die assembly 10 will be described below. That is, the press forming die 11 is initially located at the top dead center of the press forming machine (not shown), and the blank material 25 is positioned between the press forming die 11 and the press forming punch 31. Next, the blank holder 45 is elevated upward in a direction as shown by a white-out arrow toward the die face members 24, 24 until the left and right distal ends 25a, 25a of the blank material 25 are firmly retained between the die face members 24, 24 and the blank holder 45.

In a next step, the press forming die 11 is forced downward as shown by a white-out arrow. In this event, the press forming die 11 is lowered to the bottom dead center of the press forming machine such that the press forming punch 31 is press fitted to the press forming die 11. By this press forming operation, the blank material 25 is press formed into a product panel (not shown) having a desired profile.

A preferred fabrication process of the press forming die 11 and the press forming punch 31 will now be described in detail with reference to FIG. 2, which shows a first preferred method of fabricating the press forming die 11 according to the present invention.

The preferred method of fabricating the press forming die 11 is as follows:

Step (hereinafter referred to as ST) 10: Preparing a die forming prototype and a punch forming prototype.

ST 11: Press forming a first blank material with the die forming prototype and the punch forming prototype to provide a shaped panel.

ST 12: Fitting the shaped panel over the punch forming prototype.

ST 13: Placing a second blank material, a resilient sheet and the die forming prototype in a sequential order over the shaped panel fitted to the punch forming prototype.

ST 14: Lowering the die prototype toward the punch forming prototype until the die forming prototype assumes a position ahead of the bottom dead center by a predetermined distance for thereby press forming the second blank material with the shaped panel to obtain a die panel.

ST 15: Forming a backup material over an entire rear side of the die forming panel formed in ST 14 to fabricate a press forming die.

According to the preferred method including the steps ST 10 to ST 15, the press forming panel can be press formed by the die forming prototype and the punch forming prototype. Subsequently, the press forming panel is located in a fixed place relative to the punch forming prototype and is pressed to form a die panel, which is utilized as a press forming die. Since, consequently, the die surface of the press forming die can be fabricated by press forming, it is unnecessary to profile the die surface of the press forming die into a desired profile with the use of a machining center or a profiling machine as in a conventional manner. As a result, the press forming die can be fabricated in the preferred method of the present invention in the simplest and easiest fashion at low cost.

Also, the press forming die may be made of, for example, a die forming panel having a high surface hardness such as a high tension or stainless steel. In addition, the die forming panel may be worked to be hardened during a press forming step. Accordingly, the surface hardness of the die forming panel may further be hardened and, therefore, the die forming panel has an improved anti-wear performance. Since, further, the die forming panel is made of metal, the die forming panel may have a die surface that is further hardened by treating with hard chrome.

Each of various steps ST 10 to ST 15 will now be described more in detail with reference to FIGS. 3A to 7D, wherein a symbol "Δ" represents a surface conforming with the die surface of the press forming die.

Figure 3A:
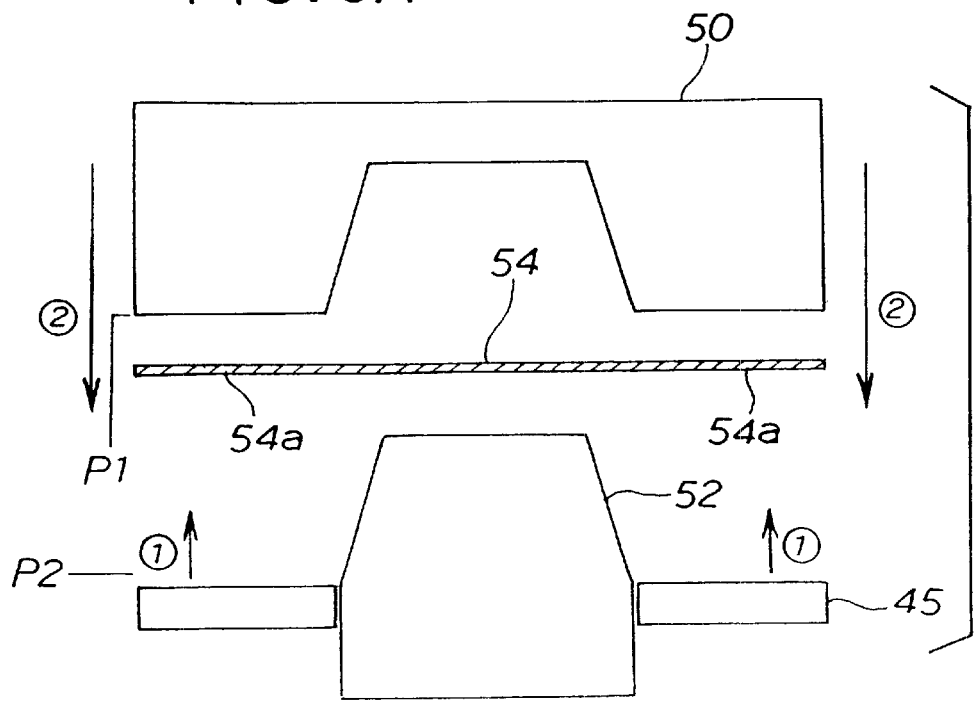
FIGS. 3A to 6B are schematic cross sectional views illustrating a fabrication process, corresponding to fabricating steps ST 10 to ST 14, of a die forming panel to be used for the die assembly.
Figure 3B:
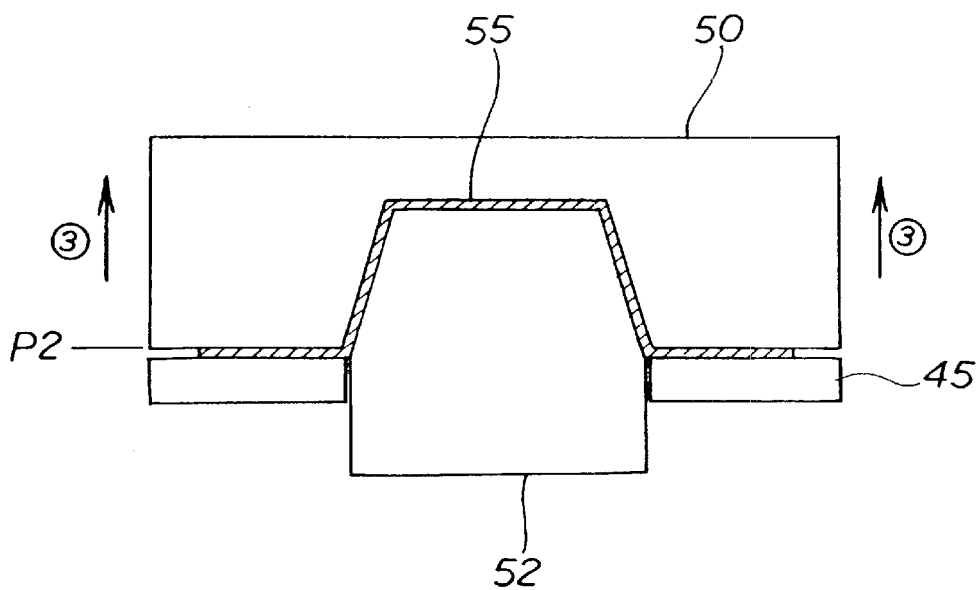

FIG. 3A shows the ST-10, and FIG. 3B shows the ST-11.

In FIG. 3A, a die forming prototype 50 and a punch forming prototype 52 are prepared, and a blank holder 45 is set to the punch forming prototype 52. In this event, the die forming prototype 50 and the punch forming prototype 52 are made of, for example, a relatively soft material such as ZAS or plastic. Therefore, the die forming prototype 50 and the punch forming prototype 52 may be fabricated in an easy manner.

In a second step, a blank material 54 is located between the die forming prototype 50 and the punch forming prototype 52, which is then moved upward as shown by an arrow ① until distal ends 54a, 54b of the blank material 54 are urged to the die forming prototype 50. Subsequently, the die forming prototype 50 is lowered as shown by an arrow ②.

As shown in FIG. 3B, the die forming prototype 50 is lowered to a bottom dead point P2 such that the first blank material 54 is press formed into a desired shape by the die forming prototype 50 and the punch forming prototype 52. By this press working, a shaped panel 55 is obtained. Thereafter, the die forming prototype 50 is elevated as shown by an arrow ③.

Figure 4A:
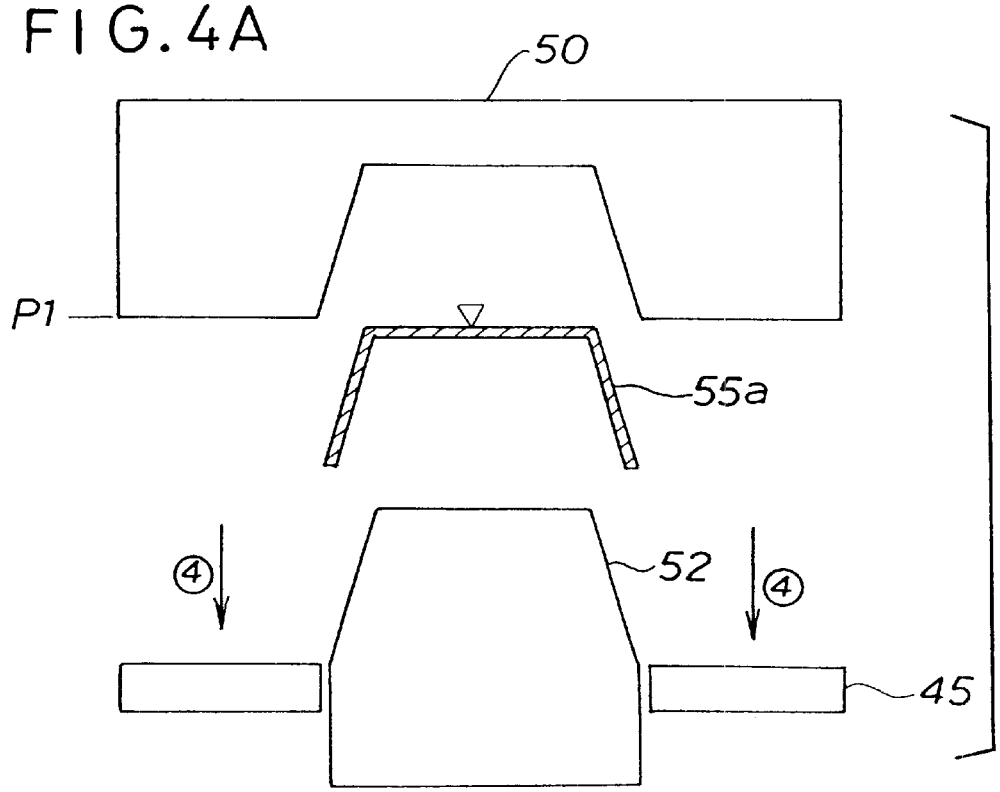
Figure 4B:
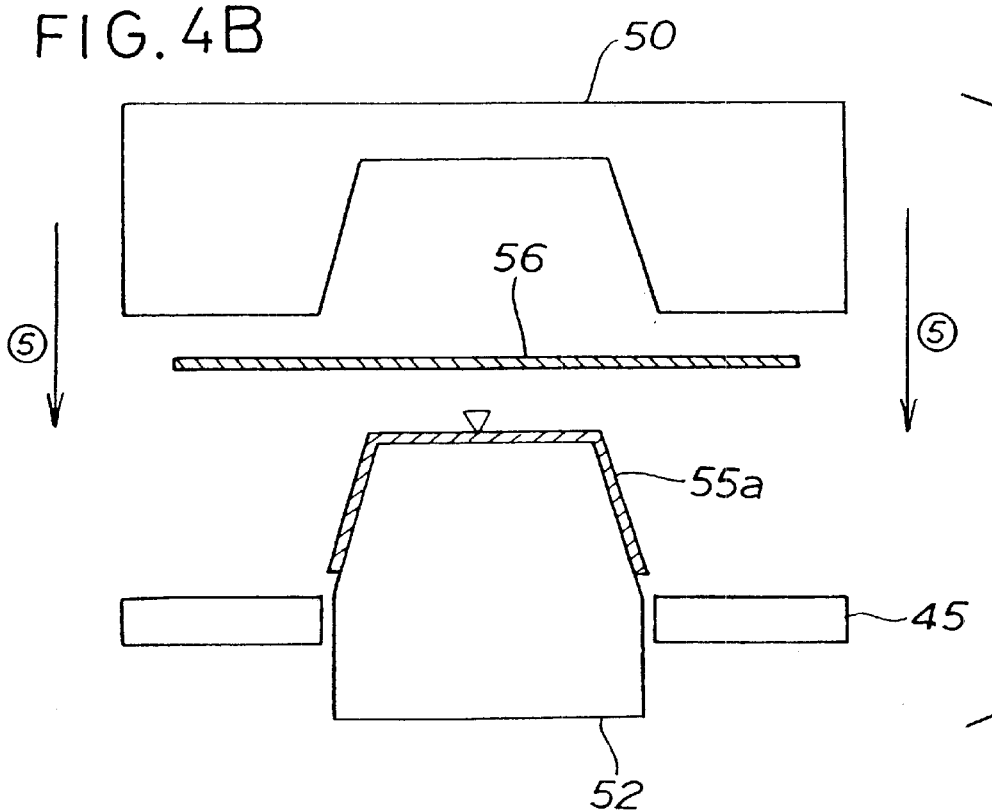

FIG. 4A shows the ST 12 in FIG. 2, and FIG. 4B shows an initial half stage of a working process for the ST 13 in FIG. 2.

In FIG. 4A, flanges of the shaped panel 55 are cut away to form a desired contoured panel 55a. Next, the die forming prototype 50 is elevated to a top dead center P1 and, thereafter, the contoured panel 55a is lowered as shown by an arrow ④ and is again fitted to the punch forming prototype 52. During this working process, an adhesive may be coated on either one of the contoured panel 55a or the punch forming prototype 52 to retain the contoured panel 55a in a fixed place with a slight force such that the contoured panel 55a is not undesirably peeled off from the punch forming prototype 52 during subsequent various working steps.

Figure 5A:
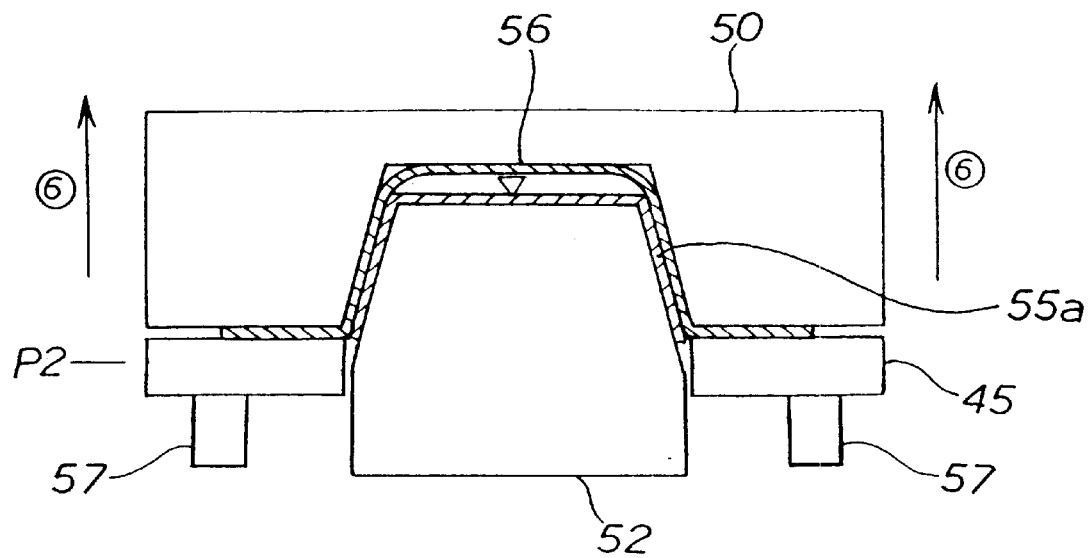
Figure 5B:
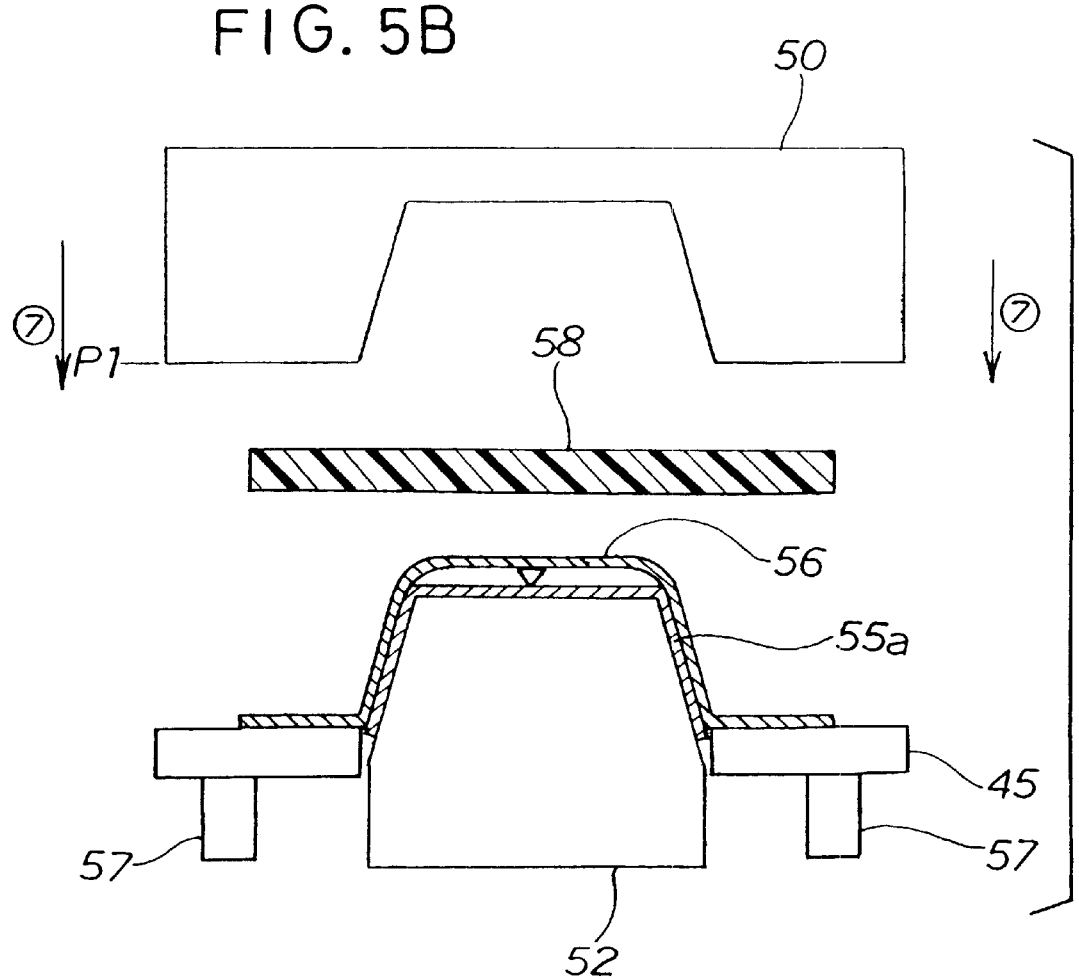

FIGS. 5A and 5B show the latter half stage of a working process for the ST 13 in FIG. 2.

In FIG. 5A, the die prototype 50 is lowered to a position ahead of the bottom dead center P2 by a predetermined distance such that the second blank material 56 is preliminarily press formed with the die forming prototype 50 and the punch forming prototype 52 to have a desired contoured profile substantially conforming to that of the contoured panel 55a.

During the preliminary working process, the die forming prototype 50 is lowered to a position ahead of the bottom dead center P2 by the predetermined distance as discussed above. The predetermined distance is selected to have a value corresponding to the thickness of the die face member 24 (see FIG. 1). As a consequence, the second blank material 56 is configured to have a preliminarily contoured shape that is reduced in thickness by an amount equal to the die face member 24. Subsequently, the die forming prototype 50 is elevated as shown by an arrow ⑥.

In FIG. 5B, the die forming prototype 50 is held stationary at the top dead center P1 and, thereafter, a resilient sheet 58 made of plastic is interposed between the preliminarily contoured, second blank material 56 and the die forming prototype 50. As a result, the second contoured blank material 56, the resilient sheet 58 and the die forming prototype 50 are located in a sequential order. Under these conditions, the die forming prototype 50 is lowered as shown by an arrow ⑦.

Figure 6A:
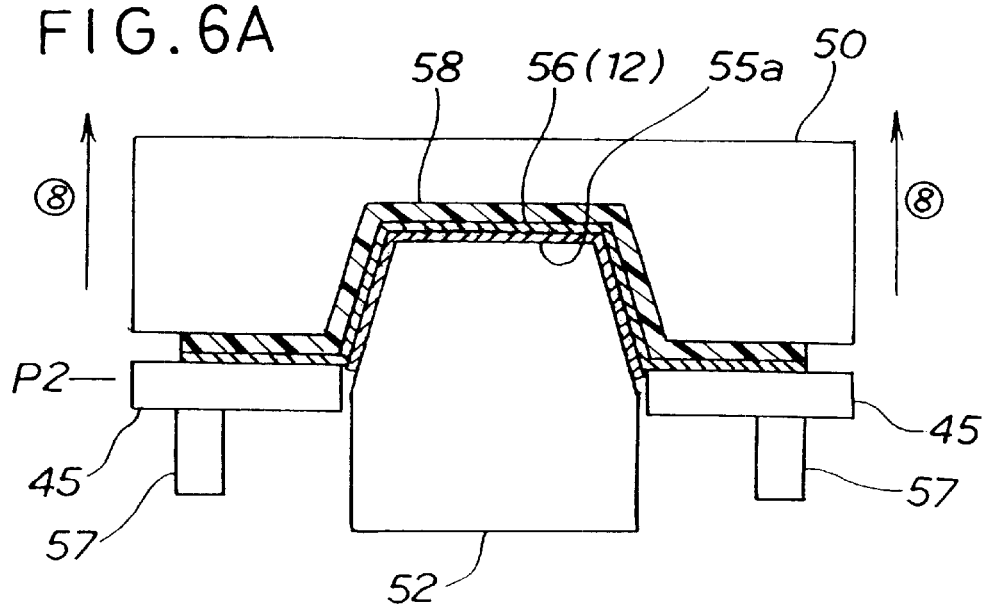
Figure 6B:
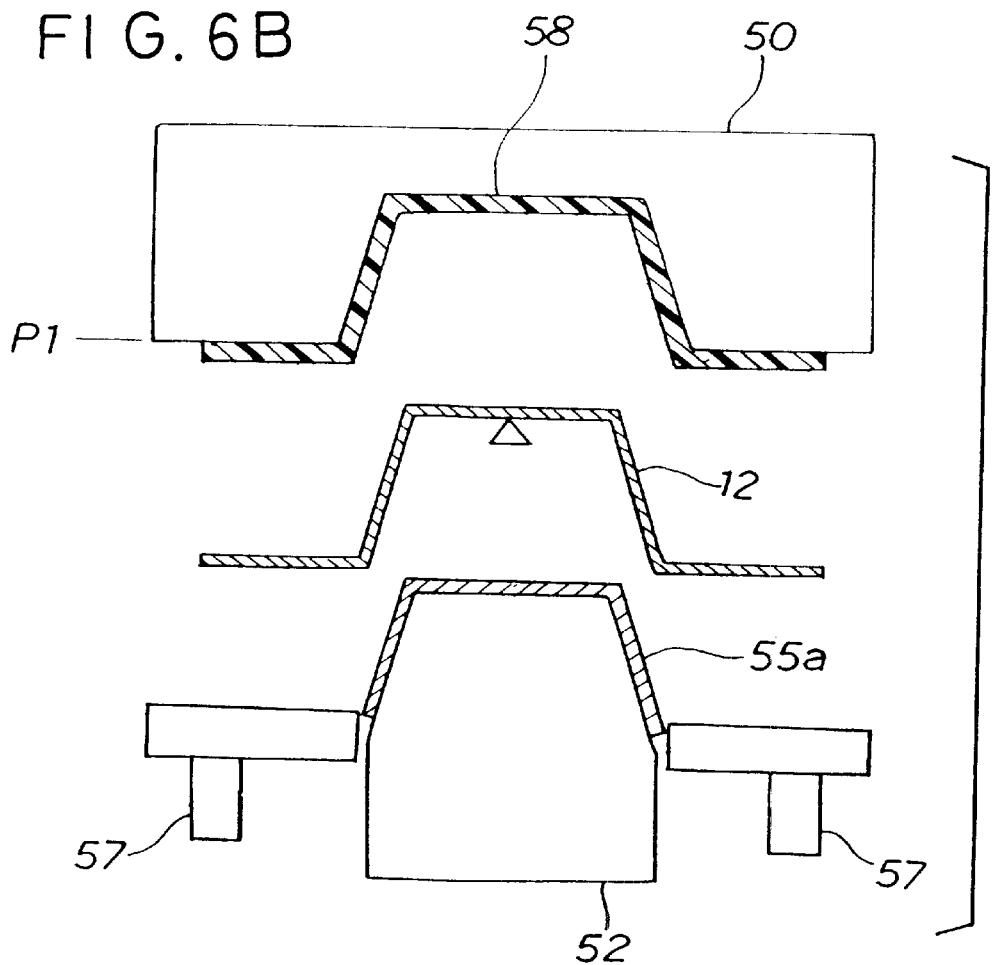

FIGS. 6A and 6B illustrate the ST-14 shown in FIG. 2.

In FIG. 6A, the die prototype 50 is forced downward to accommodate therein the punch forming prototype 52 to a position ahead of the bottom dead center P2 of the press machine displaced by a given distance and, at that point, the die forming prototype 50 is held stationary, thereby press forming the second blank material 56 having a desired profile conforming to the shaped panel 55a. Thus, the die forming panel 12 is obtained.

As shown in FIG. 1, also, the die assembly 10 has the press forming die 11 fixedly secured to the die face member 24, to which the setting position of the blank holder 45 is determined. In FIG. 6A, however, since the die forming prototype 50 is not provided with the die face member 24, if the blank holder 45 is set to the position of FIG. 1, there exists a gap equal to the thickness of the die face member 24 between the die forming prototype 50 and the blank holder 45. Accordingly, blocks 57 are employed to adjust the height position of the blank holder 45. By this adjustment, both distal ends of the die forming panel 12 can be preferably shaped by the blank holder 45 and the die forming prototype 50. In this manner, the blocks 57 are suitably employed when they are required in a press die forming process.

As a result, when the resilient sheet 58 is located between the second blank material 56 and the punch forming prototype 52, even if the die forming prototype 50 is stopped at the position ahead of the bottom dead center P2 displaced by the given distance, the second blank material 56 can be pressed with a given force to form the shaped panel 55a owing to the resilient sheet 58. It is to be noted here that the thickness of the resilient sheet 58 is selected to have a value greater than the given distance.

Also, during press forming of the die forming panel 12, the die forming panel 12 may be formed in a two-stage process, namely, a first preliminary press forming step (see FIG. 5) and a second finish press forming step. That is, if it is tried to form the die forming panel 12 by a single step of press forming, an excessively large press force should be applied to the die forming panel 12 during press forming, resulting in a warping or deforming of the final product. Therefore, the press forming process may be performed in two stages in a manner as discussed above, and the shape of the press forming die can be formed with a high accuracy. This press forming process is particularly advantageous in that various concave or convex portions of small size can be precisely formed on the die forming press 12 with a high accuracy. After the die forming panel 12 has been press formed, the die forming prototype 50 is raised upward as shown by an arrow ⑧.

In FIG. 6B, the die forming prototype 50 is held stationary at the top dead point P1, and the die forming panel 12 is removed from the die forming prototype 50.

FIGS. 7A to 7D show the ST 15 shown in FIG. 2.

Figure 7A:
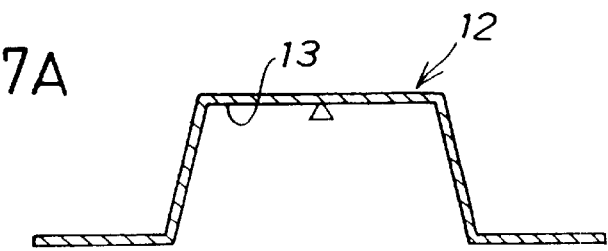
FIGS. 7A to 7D are schematic cross sectional views illustrating a fabrication process, corresponding to a step of ST 15 of FIG. 2, of a first preferred embodiment of a press forming die assembly according to the present invention with the use of a die forming panel obtained in steps shown in FIGS. 3A to 6B.

In FIG. 7A, the die panel 12 has a concaved die surface 13 indicated by a symbol Δ.

Figure 7B:
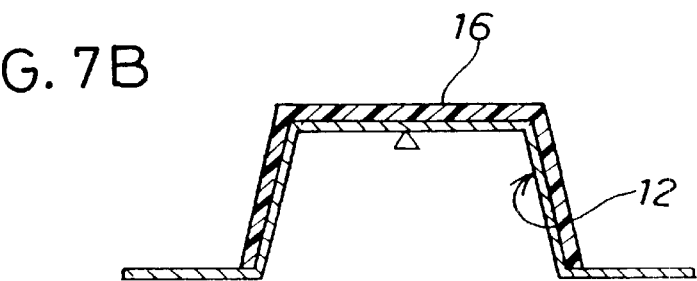

As shown in FIG.7B, the backup lining 16 is placed over the concave area at the rear side of the die panel 12.

Figure 7C:
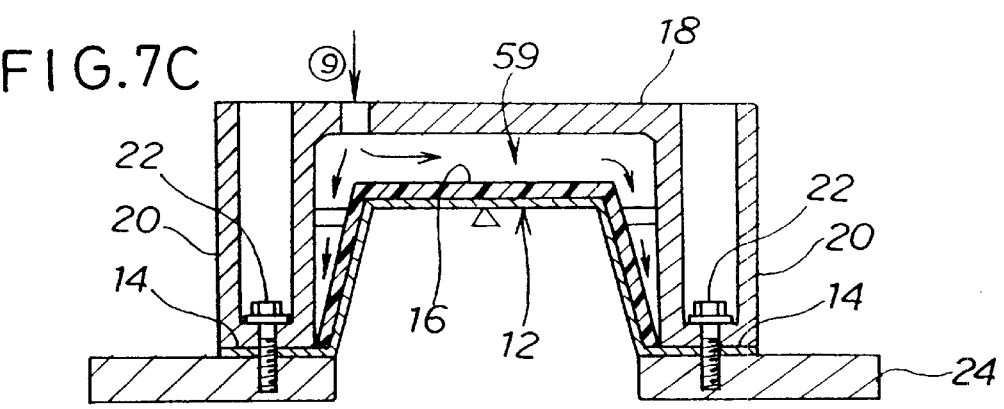

In the next step shown in FIG. 7C, after the die panel 12 is set in a fixed position of the frame body 18, the flanges 14, 14 of the die panel 12 are interposed between the legs 20, 20 of the frame body 18 and the die face member 24. Thereafter, the die face member 24 is fixedly secured to the legs 20, 20 of the frame body 18 by threaded bolts 14, 14, thereby retaining the die panel 12 in a fixed place. Subsequently, a slurry shaped, high strength cement is filled into a space 59 between the frame body 18 and the die panel 12 (that is, the backup lining 16).

Figure 7D:
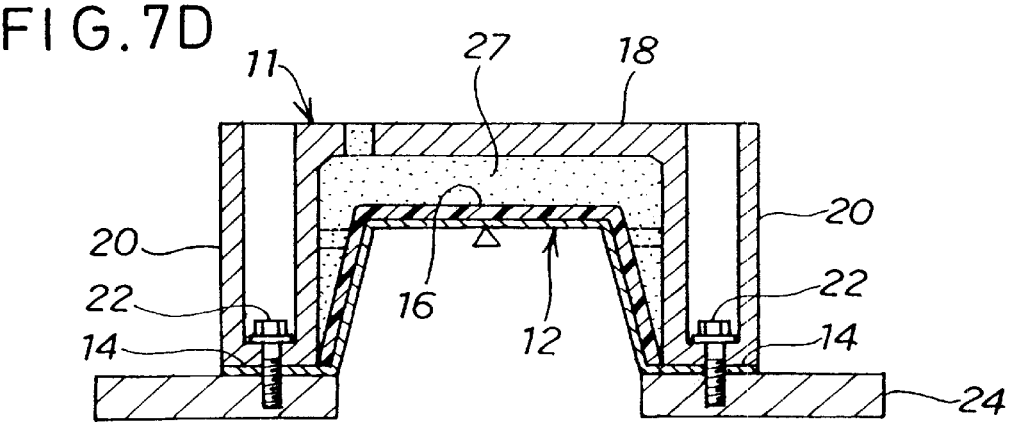

In FIG. 7D, the high strength cement is hardened, thereby providing the rigid backup material 27 for the die forming panel 12 to form the press forming die 11. In this manner, the fabricating work process of the press forming die 11 is completed.

Now, a preferred fabricating work process of the press punch 31 will be discussed with reference to FIG. 8. It is to be understood that it may be possible to employ the die forming prototype and the punch forming prototype prepared in the fabrication stage ST 10 for the press forming die shown in FIG. 2 and, in such a case, fabrications stages ST 20 and ST 21 in the fabrication work process for the press forming punch may be dispensed with. However, in this preferred embodiment, the fabrication process for the press forming punch will be described with respect to an example including a ST 20 for newly preparing a die forming prototype and a punch forming prototype, and a ST 21 for newly forming a shaped panel.

The preferred method of fabricating the press forming punch 31 is as follows:

ST 20: Preparing a die forming prototype and a punch forming prototype in thee same manner as those steps in ST 10 of the fabricating work process of the press forming die discussed above with reference to FIG. 2.

ST 21: Press forming a first blank material with the die forming prototype and the punch forming prototype to obtain a shaped panel in the same manner as that of ST 11 of the fabricating work process for the press forming die described with reference to FIG. 2.

ST 22: Fitting the shaped panel over the die forming prototype.

ST 23: Placing a second blank material, a resilient sheet and the punch forming prototype in a sequential order over the shaped panel fitted to the die forming prototype.

ST 24: Lowering the punch forming prototype toward the die forming prototype until the punch forming prototype assumes a position ahead of the bottom dead point of the press forming machine by a predetermined distance for thereby press forming the second blank material with the shaped panel to obtain a punch panel.

ST 25: Forming a backup material over an entire inner side of the punch panel to fabricate a press punch.

According to the preferred method including ST 20 to ST 25, the shaped panel can be press formed by the die forming prototype and the punch forming prototype. Subsequently, the shaped panel is fitted to the die forming prototype and is press formed to obtain a press punch. Since, consequently, the die surface of the press forming punch can be fabricated by press forming, it is unnecessary to profile the die surface of the press punch into a desired shape with the use of a machining center or a profiling machine as in a conventional manner. As a result, the press forming punch can be fabricated in the preferred method of the present invention in the simplest and easiest fashion at low cost.

Also, the press forming punch may be made of, for example, a die forming panel having a high surface hardness such as a high tension or stainless steel. In addition, the punch forming panel may be treated to be hardened during a press forming step. Accordingly, the surface hardness of the punch forming panel may further be hardened and, therefore, the punch forming panel has an improved anti-wear performance. Since, further, the punch forming panel is made of metal, the punch forming panel may have a die surface that is further hardened by treating with hard chrome.

Each of various steps ST 20 to ST 25 will now be described more in detail with reference to FIGS. 9 to 13, wherein a symbol "Δ" represents a surface conforming with the die surface of the press forming punch.

Figure 9A:
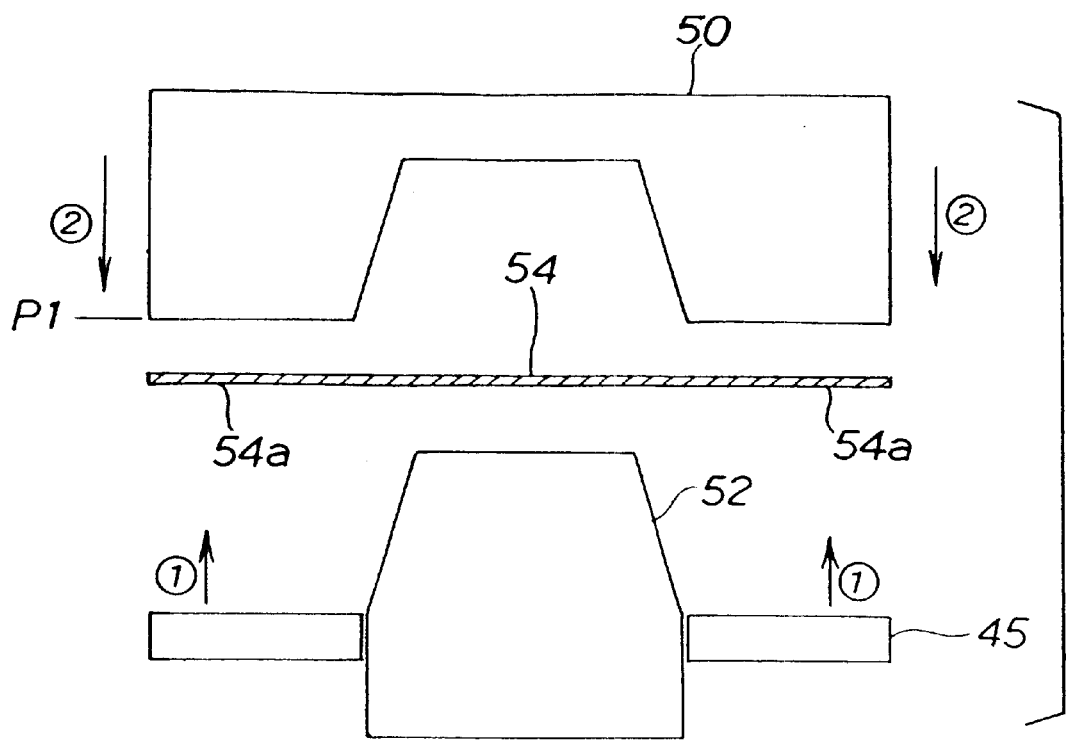
FIGS. 9A to 12B are schematic cross sectional views illustrating a fabrication process, corresponding to steps ST 20 to ST 24 shown in FIG. 8, of a punch forming panel to be used for fabricating a press forming punch.
Figure 9B:
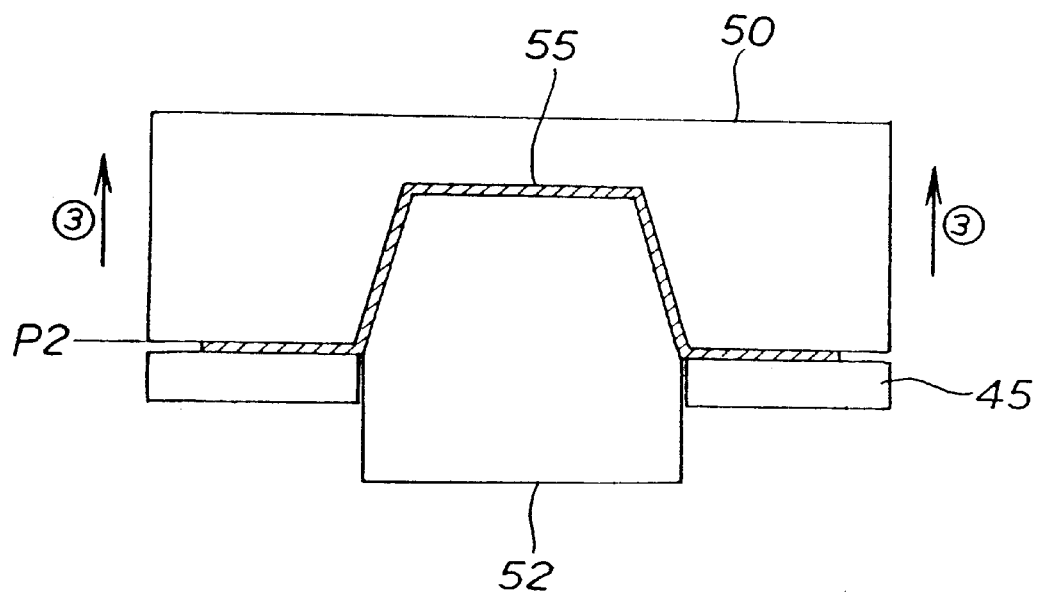

FIG. 9A shows the ST 20, and FIG. 9B shows the ST 21.

In FIG. 9A, a die forming prototype 50 and a punch forming prototype 52 are prepared, and a blank holder 45 is set to the punch prototype 52. In this event, the die forming prototype 50 and the punch forming prototype 52 are made of, for example, a relatively soft material such as ZAS or plastic. Therefore, the die forming prototype 50 and the punch forming prototype 52 may be fabricated in an easy manner.

In a second step, a blank material 54 is located between the die forming prototype 50 and the punch forming prototype 52, which is then moved upward as shown by an arrow ① until the blank material 54 is urged to the die forming prototype 50. Subsequently, the die forming prototype 50 is lowered as shown by an arrow ②.

As shown in FIG. 9B, the die forming prototype 50 is lowered to a bottom dead center P2 such that the first blank material 54 is press formed into a desired shape by the die forming prototype 50 and the punch forming prototype 52. By this press working, a contoured panel 55 is obtained. Thereafter, the die forming prototype 50 is elevated as shown by an arrow ③.

Figure 10A:
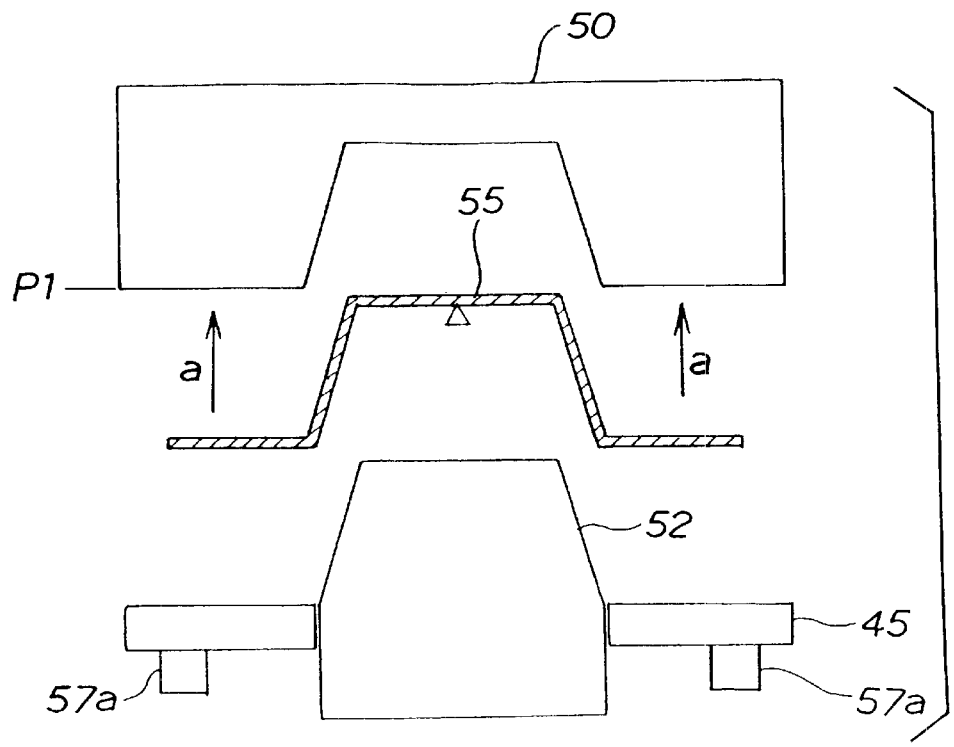
Figure 10B:
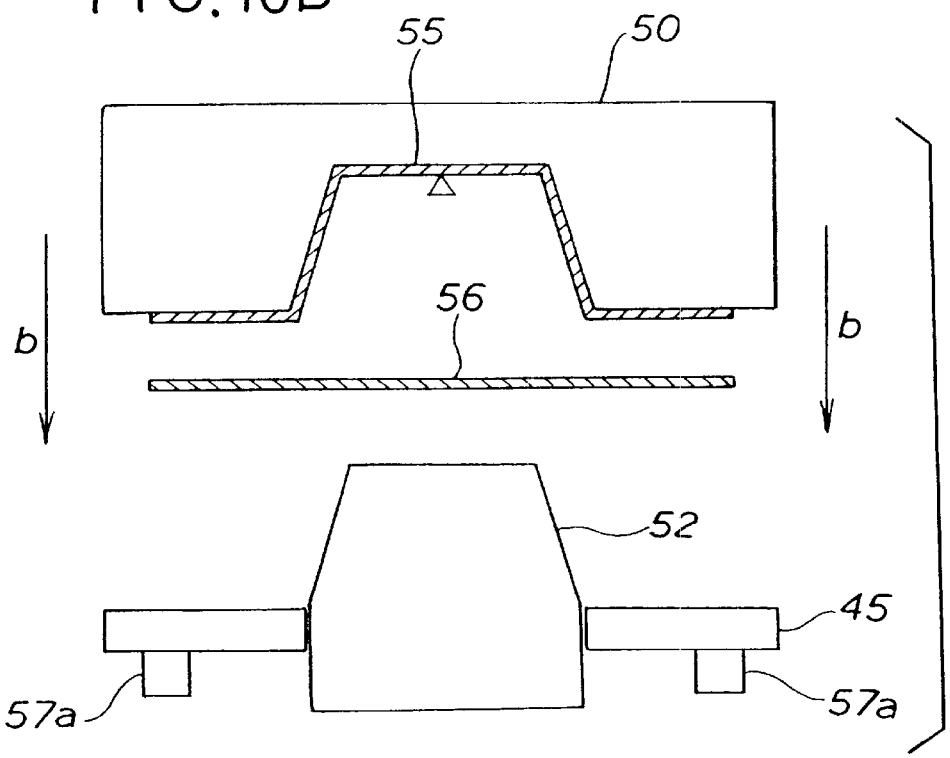

FIG. 10A shows the ST 22 shown in FIG. 8, and FIG. 10B shows an initial half stage of a working process for the ST 23 in FIG. 8.

In FIG. 10A, after the die forming prototype 50 is elevated to the top dead point P1, the contoured panel 55 is elevated as shown by an arrow a and is fitted to the die forming prototype 50. During this working process, an adhesive may be coated on either one of the contoured panel 55 or the die forming prototype 50 to retain the contoured panel 55 in a fixed place with a slight force such that the contoured panel 55 is not undesirably peeled of f from the die forming prototype 50 during subsequent various working steps.

In FIG. 10B, a second blank material 56 is located between the contoured panel 55 fitted to the die forming prototype 50, and the punch forming prototype 52, and the die forming prototype 50 is lowered as shown by an arrow b.

Figure 11A:
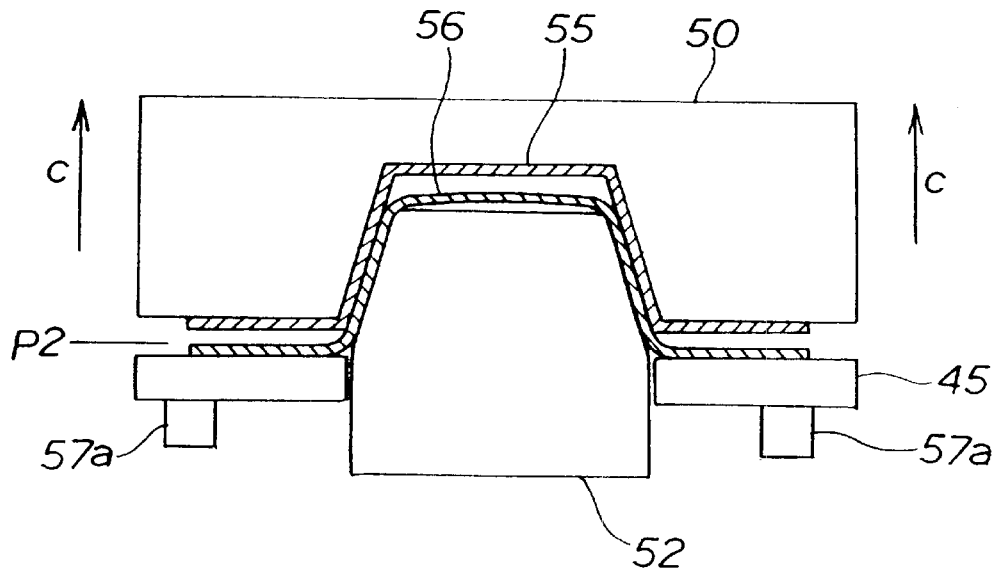
Figure 11B:
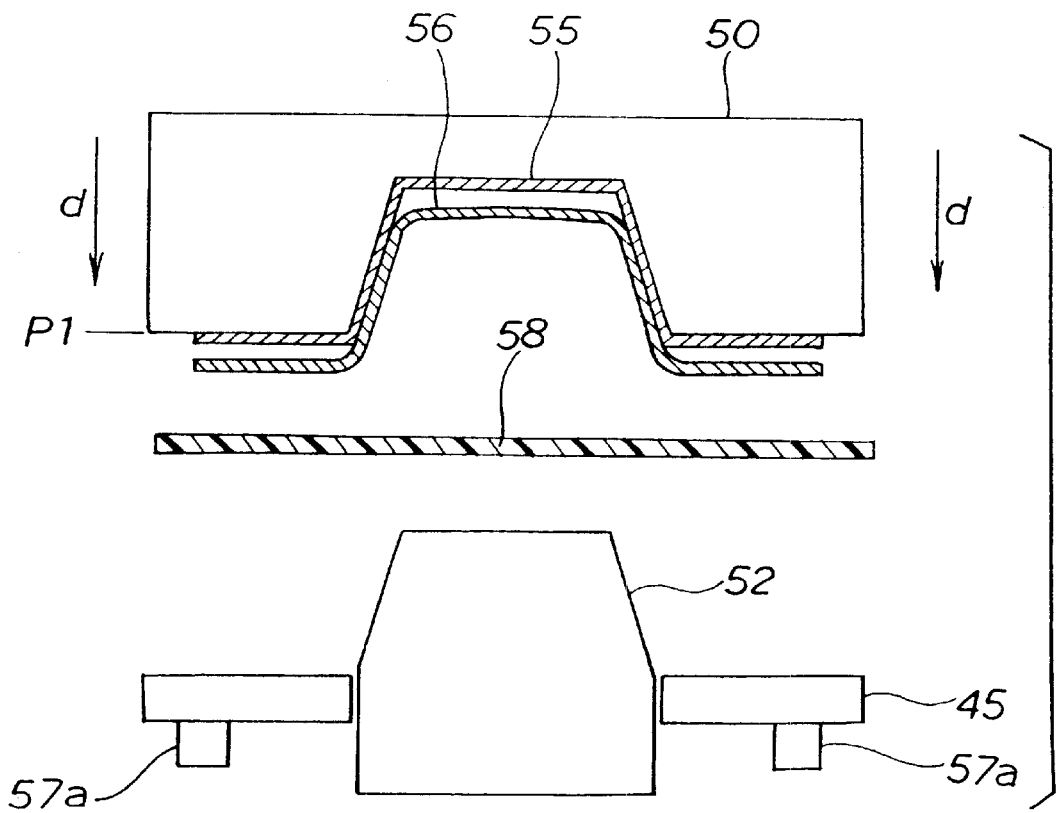

FIGS. 11A and 11B show the latter half stage of a working process for the ST 23 in FIG. 8.

In FIG. 11A, the die prototype 50 is lowered to a position ahead of the bottom dead position P2 by a predetermined distance such that the second blank material 56 is preliminarily press formed with the die forming prototype 50 and the punch forming prototype 52 to have a desired contoured profile substantially conforming to that of the contoured panel 55.

During the preliminary working process, the die forming prototype 50 is lowered to a position ahead of the bottom dead center P2 by the predetermined distance as discussed above. The predetermined distance is selected to have a value corresponding to the distance between the point P3 of the die forming prototype 50 shown in FIG. 12A and the bottom dead point P2. Subsequently, the die forming prototype 50 is elevated upward as shown by an arrow c.

In FIG. 11B, the die prototype 50 is held stationary at the top dead center Pi and, thereafter, a resilient sheet 58 made of plastic is interposed between the preliminarily contoured, second blank material 56 and the die forming prototype 50. As a result, the second contoured blank material 56, the resilient sheet 58 and the die forming prototype 50 are located in a sequential order. Under these conditions, the die forming prototype 50 is lowered as shown by an arrow d.

Figure 12A:
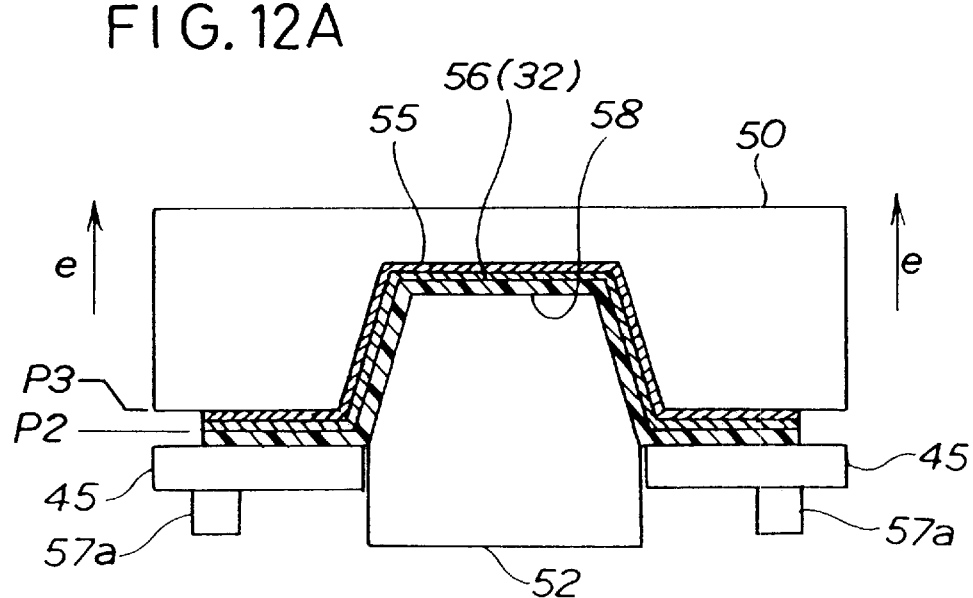
Figure 12B:
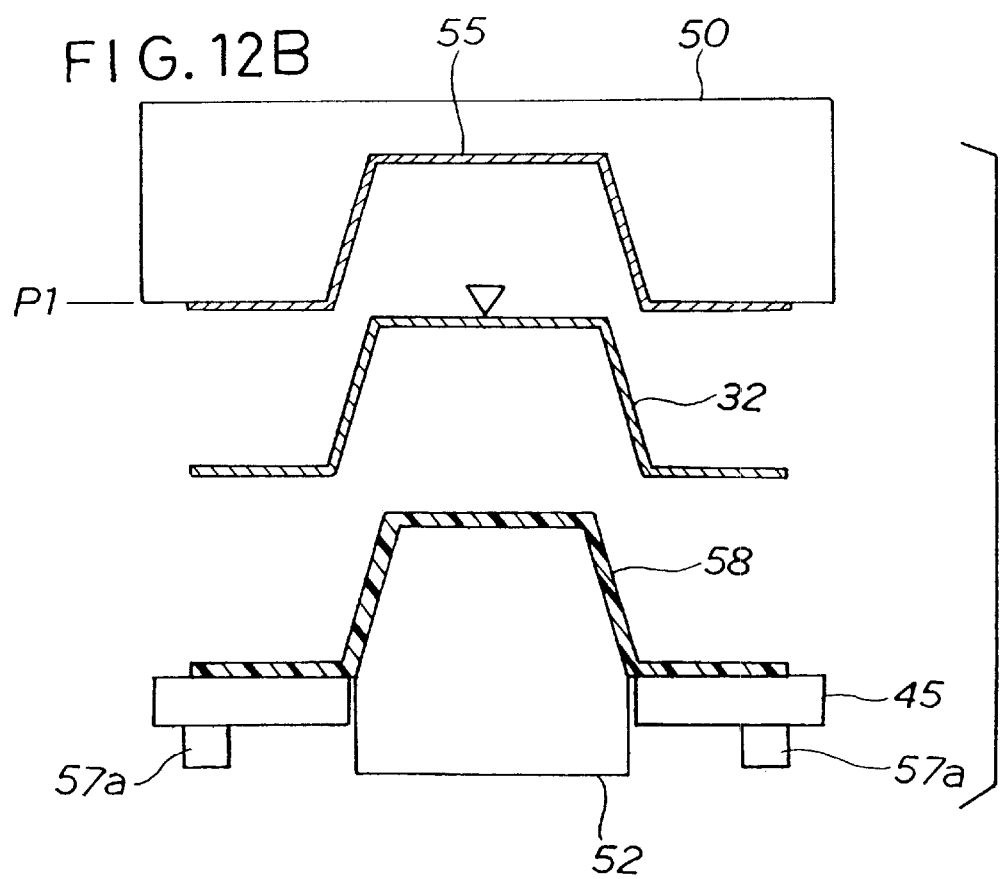

FIGS. 12A and 12B illustrate the ST 24 shown in FIG. 8. In FIG. 12A, the die forming prototype 50 is forced downward to accommodate therein the punch forming prototype 52 to a position ahead of the bottom dead point P2 of the press forming machine displaced by a given distance and, at that point, the die forming prototype 50 is held stationary, thereby press forming the second blank material 56 having a desired profile conforming to the shaped panel 55. Thus, the punch forming panel 32 is obtained.

During the above fabrication process of the punch forming panel 32, the position of the blank holder 45 is adjusted by using the blocks 57a. By this adjustment, the die forming prototype 50 is prevented from being applied with undesirable excessive force, thereby avoiding the die forming prototype 50 from being seriously damaged. In such a manner, the blocks 57a may be suitably employed in various steps in the fabrication process of the press forming punch.

As a result, when the resilient sheet 58 is located between the second blank material 56 and the punch forming prototype 52, even if the die prototype 50 is stopped at the position ahead of the bottom dead center P2 displaced by the given distance, the second blank material 56 can be pressed with a given pressure to form the shaped panel 55a owing to the resilient sheet 58. It is to be noted here that the thickness of the resilient sheet 58 is selected to have a value greater than the given distance.

As discussed above, during press forming the punch forming panel 32, the punch forming panel 32 may be formed in a two-stage press forming operation, namely, a first preliminary press forming step (see FIGS. 11A and 11B) and a second finish press forming step. Consequently, the punch panel 32 can have a desired contoured shape with high precision in the same manner as the die panel discussed above. This process is advantageous particularly in that the punch panel 32 may have small sized concave or convex contoured shapes with high precision owing to the second finish press forming operation. After press forming the punch forming panel 32, the die forming prototype 50 is elevated upward as shown by an arrow e in FIG. 11A.

In FIG. 12B, the die prototype 50 is held stationary at the top dead center P1, and the punch forming panel 32 is removed from the die forming prototype 50.

FIGS. 13A to 13D show the ST 25 shown in FIG. 8.

Figure 13A:
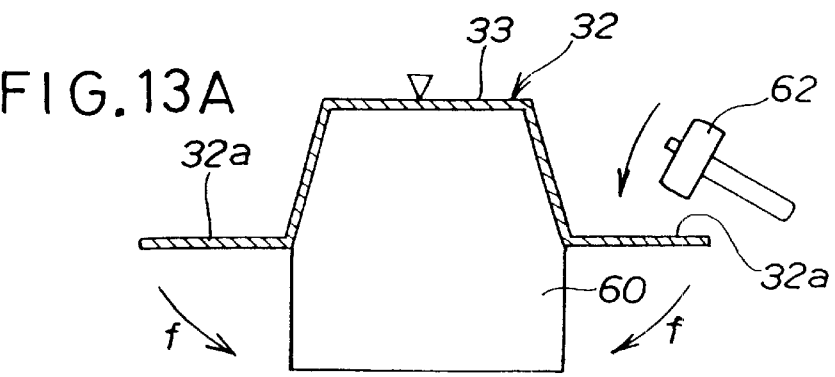
FIGS. 13A to 13E are schematic cross sectional views illustrating a fabrication process, corresponding to a step ST 25 shown in FIG. 8, of a first preferred embodiment of a press forming punch according to the present invention.

In FIG. 13A, the punch forming panel 32 is placed on a stationary die 60, and flanges 32a, 32a are bent downward as shown by an arrow f by striking these flanges against the stationary die 60. Also, the punch forming panel 32 has a convex die surface 33 indicated by a symbol Δ.

Figure 13B:
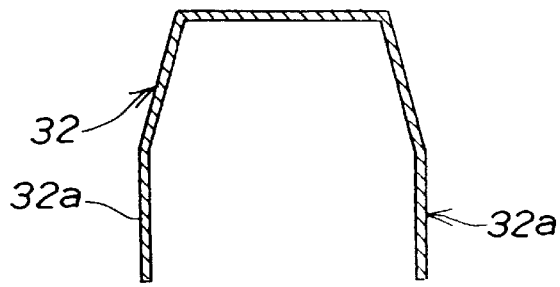

FIG. 13B illustrates a condition in which the flanges 32a, 32a are bent vertically downward in the above forming step.

Figure 13C:
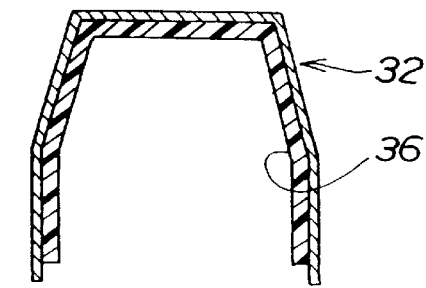

In the step shown in FIG. 13C, a backup lining 36 is placed over the concave area at an inner side of the punch forming panel 32.

Figure 13D:
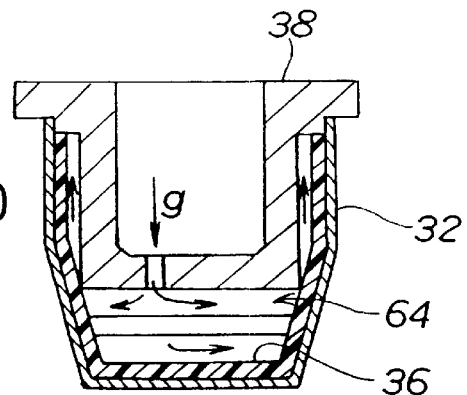

In the next step shown in FIG. 13D, after the punch forming panel 32 is set in a fixed position of the frame body 38, a slurry shaped, high strength cement is filled into a space 64 between the frame body 38 and the punch panel 32 (that is, the backup lining 36).

Figure 13E:
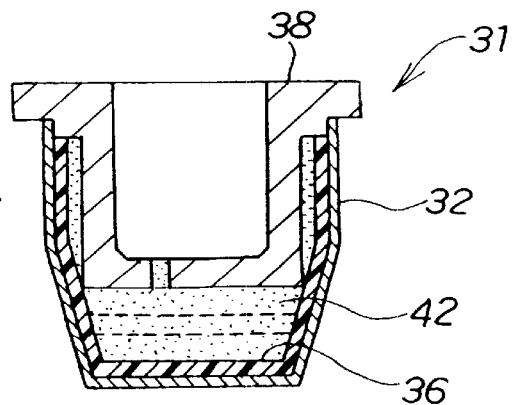

In a step of FIG. 13E, the high strength cement is hardened, thereby providing the rigid backup material 42 for the punch panel 32 to form the press punch 31.

Now, the press forming punch and the press forming die shown in the second to fourth embodiments will be described in detail below, and the same parts bear the same reference numerals as those used in these embodiments.

Figure 14A:
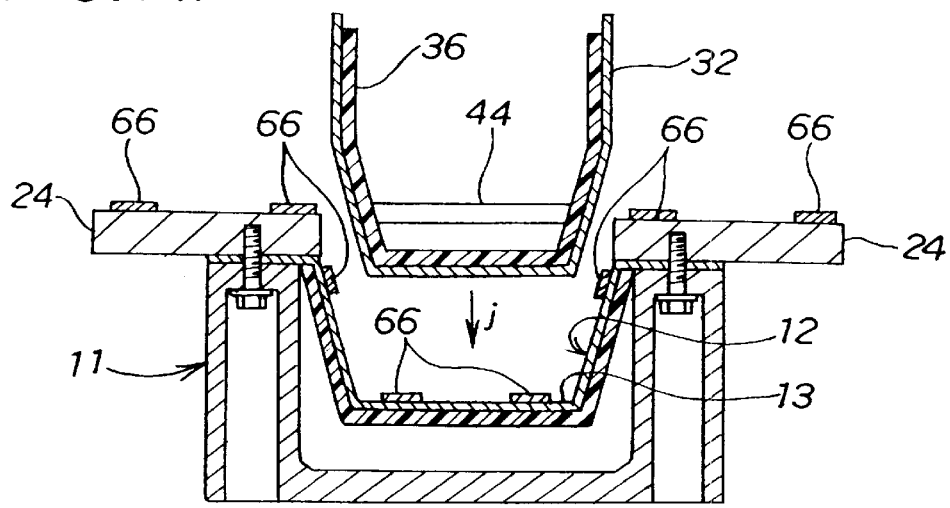
FIGS. 14A to 14C are cross sectional views illustrating a fabrication process of a second preferred embodiment of a press forming punch according to the present invention.
Figure 14B:
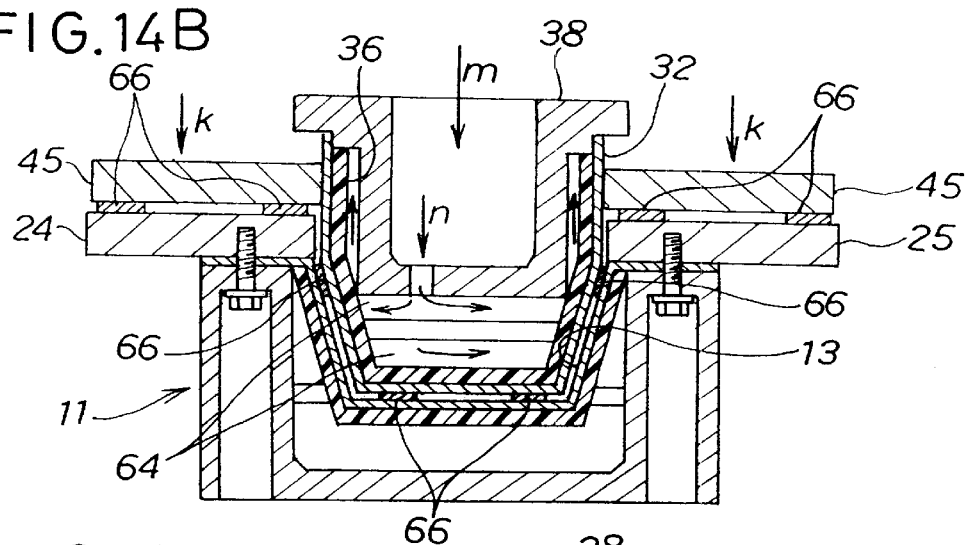
Figure 14C:
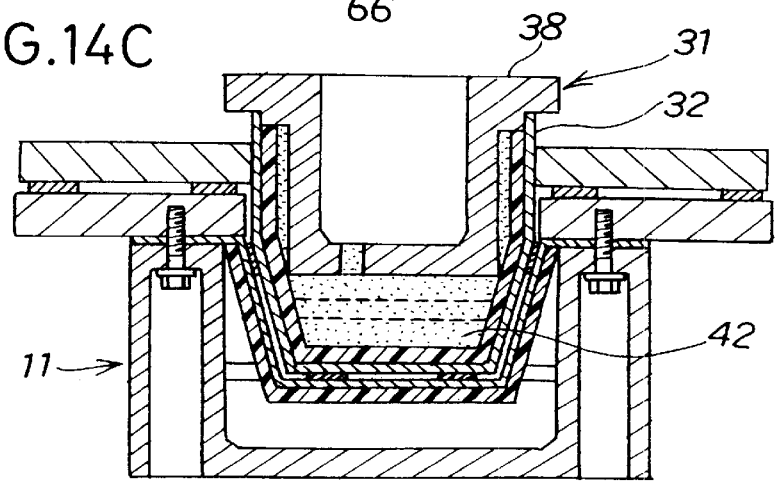

FIGS. 14A to 14C illustrate a fabrication process for the press punch of the second preferred embodiment.

In FIG. 14A, the press die 11 is turned over from a first state of FIG. 7C to a second state of FIG. 14A such that the die forming panel 12 is turned upward. Then, a plurality of shim plates 66 are adhered to both a concave die surface 13 of the die forming panel 12 and the die face member 24. It is to be noted here that each of the shim plates 66 is designed to have a thickness equal to that of the product panel (not shown). The shim plates 66 may be replaced with a suitable means such as a shaped panel 55a (see FIG. 4A) that is adhered directly to the concave die surface 13.

In a next step, the backup material 36 is adhered to the inner surface of the punch forming panel 32 and, thereafter, a plurality of stems 44 are fixed to the punch forming panel 32 to provide a reinforced structure while providing a positioning property. The punch forming panel 32 is then moved downward as shown by an arrow j.

In a step of FIG. 14B, the punch forming panel 32 is placed on the plurality of shim plates 66 of the concave die surface 13. Subsequently, the blank holder 45 is placed on the shim plates 66 of the die face member 24 in a manner shown by an arrow k, and the frame body 38 is moved downward as shown by an arrow m such that the frame body 38 is set to the punch forming panel 32. Then, blank holders 45, 45 are moved close to one another to sandwich the punch forming panel 32. In a succeeding step, the high strength cement in the slurry form is filled in a space 64 defined between the frame body 38 and the punch forming panel 32 (namely, the backup material 36).

In a step of FIG. 14C, the high strength cement is hardened, and the hardened cement functions as a core member, namely, the backup material 42 of the punch forming panel 32, thereby providing the press forming punch 31.

According to the second preferred embodiment, the punch forming panel 32 may be maintained in an assembled state with the use of the press forming die 11. Accordingly, the press forming punch 31 can be assembled in a simple fashion.

Also, the press forming die 11 may be fabricated after the press punch 31 has been fabricated. In this event, the die forming panel 12 is maintained in its assembled form with the use of the press forming punch 31. As a result, the press forming die 11 can be assembled in a simple manner.

Figure 15A:
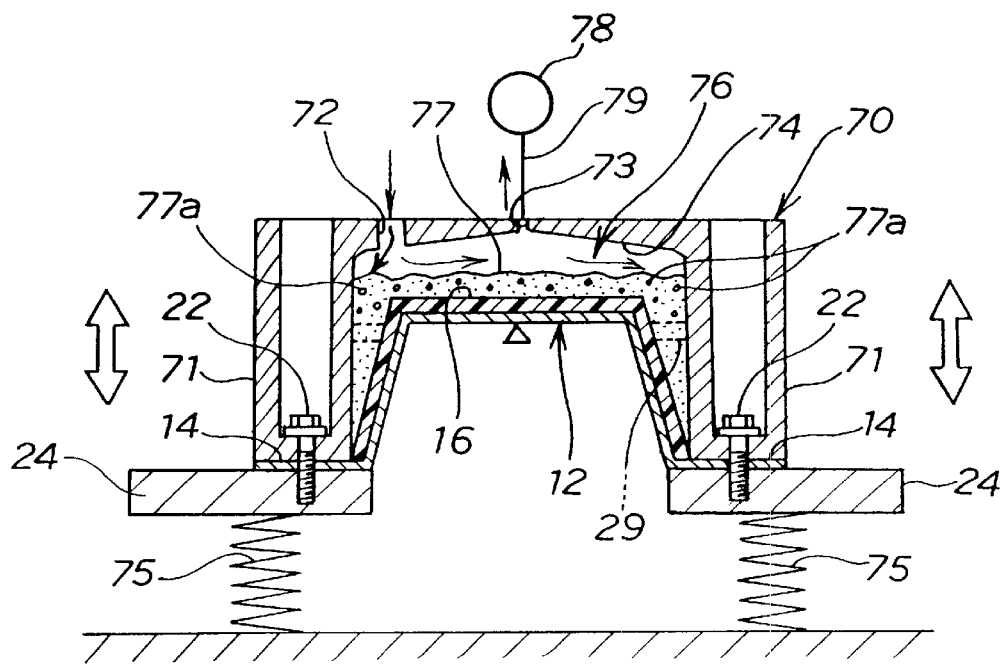
FIGS. 15A and 15B are cross sectional views illustrating a fabrication process of a first preferred embodiment of a press forming die according to the present invention.
Figure 15B:
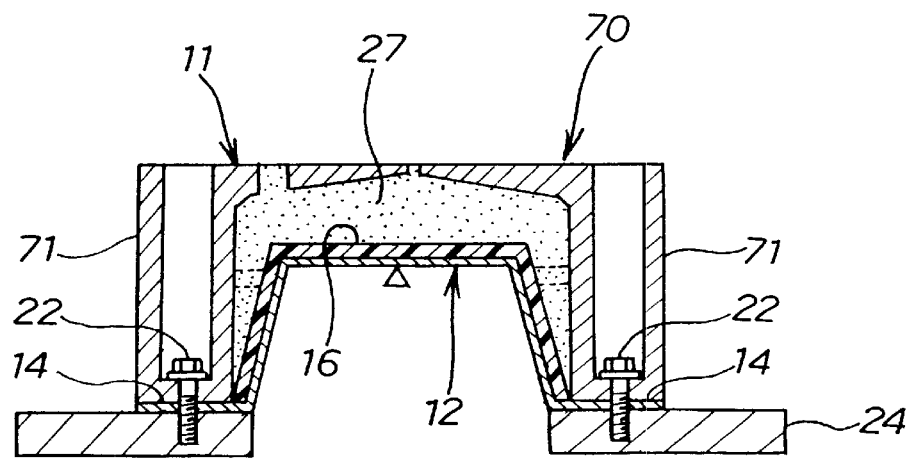

FIGS. 15A and 15B illustrate a fabrication process for a third preferred embodiment of a press forming die according to the present invention.

In a fabrication step shown in FIG. 15A, the die forming panel 12 having the backup material 16 is set to a frame body 70. Then, the flanges 14, 14 of the die forming panel 12 are sandwiched between legs 71, 71 of thee frame body 70 and the die face members 24, 24. Subsequently, the die face members 24, 24 are fastened to the legs 71, 71 of the frame body 70 by fastener bolts 22, 22 such that the die forming panel 12 is fixed to the frame body 70.

In a succeeding step, the frame body 70 fixedly supporting the die panel 12 is placed on vibrating springs 75, 75, by which the frame body 70 and the die forming panel 12 is vertically vibrated upward or downward as shown by a white-out arrow. Under these conditions, a high strength cement in a slurry form is filled through a supply port 72 into a space 76 defined between the frame body 70 and the die forming panel 12 (namely, the backup material 16). After this filling step, a plurality of stems 29 are located in given positions to prevent the die forming panel 12 from being deformed or warped.

The high strength cement in the slurry form will be prepared in a process as will be described below. Initially, a vacuum type mixer (not shown) is supplied with cement, and 10% metallic fibers and 10% water reducing agent by volume of the total volume of the cement are added thereto. The mixer is then driven to mix the cement, metallic fibers and the water reducing agent, thereby obtaining the high strength cement 77 in the slurry form. Since the cement contains the metallic fibers, the cement has an improved strength. The water reducing agent functions to shorten the hardening time. The metallic fibers and the water reducing agent also function to reduce a contraction of the cement.

The high strength cement 77 in a slurry form is filled into the space 76 and, at the same time, a vacuum pump 78 is driven. By operating the vacuum pump 78, bubbles 77a remaining in the cement 77 is removed by vacuum. That is, when the vacuum pump 77 is operated, the space 76 is evacuated and, consequently, the babbles 77a remaining inside of the high strength cement 77 in the slurry form is sucked by the vacuum pump 78. During this sucking step, the frame body fixedly supporting the die forming panel 12 is vertically vibrated upward or downward as shown by the white-out arrow and, therefore, the bubbles contained in the high strength cement 77 are effectively removed in a shortened period. It is thus possible to remove the whole bubbles 77a remained in the high strength cement 77 in a highly reliable manner. That is, the bubbles 77a can be removed from the high strength cement 77 owing to both the vibration assisting the movement of the bubbles in the cement and the vacuum assisting the sucking of the bubbles 77a from the high strength cement 77.

Remaining air in the space 76 is sucked through an exhaust port 73 and a conduit 79, and is exhausted to outside by the vacuum pump 78 as shown by an arrow.

Since a ceiling 74 of the frame body 70 has a gentle slope upwardly inclined toward the exhaust port 73, the air remaining in the space 76 is effectively collected. Consequently, the air in the space 76 can be exhausted in a reliable manner.

In a step shown in FIG. 15B, the high strength cement 77 formed in the step shown in FIG. 15A is hardened to form the backup material 27, thereby obtaining the press forming die 11. Thus, the fabrication process of the press forming die 11 is completed.

In such a press forming die 11, since the bubble 77a is removed from the high strength cement 77 in a manner as described above with reference to FIG. 15A, there exists no small cavities remained in the backup material. Accordingly, the backup material 27 has an improved durability, thereby increasing the durability of the press forming die 11.

Figure 16A:
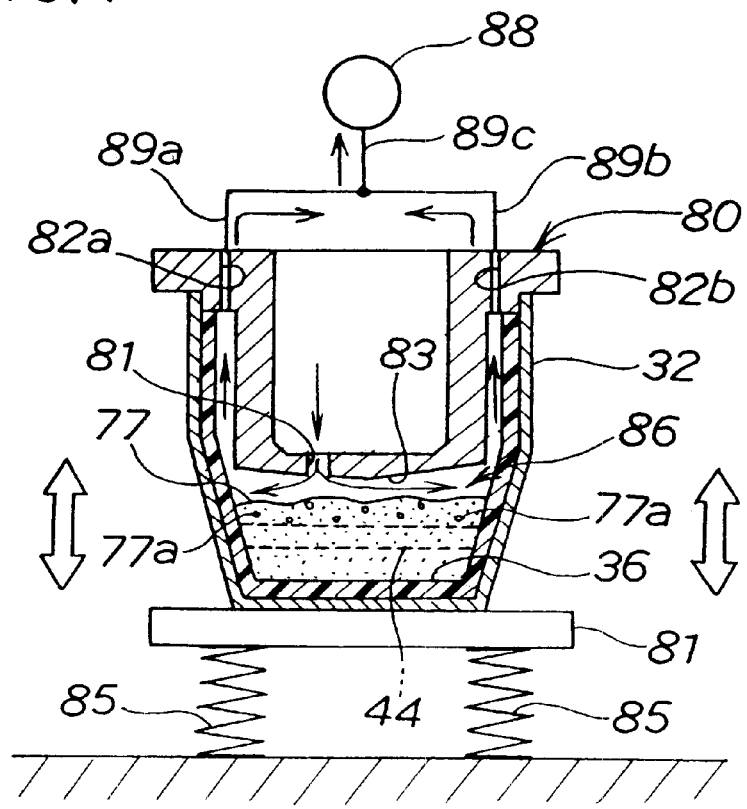
FIGS. 16A and 16B are schematic cross sectional views illustrating a fabrication process of a third preferred embodiment of a press forming punch according to the present invention.
Figure 16B:
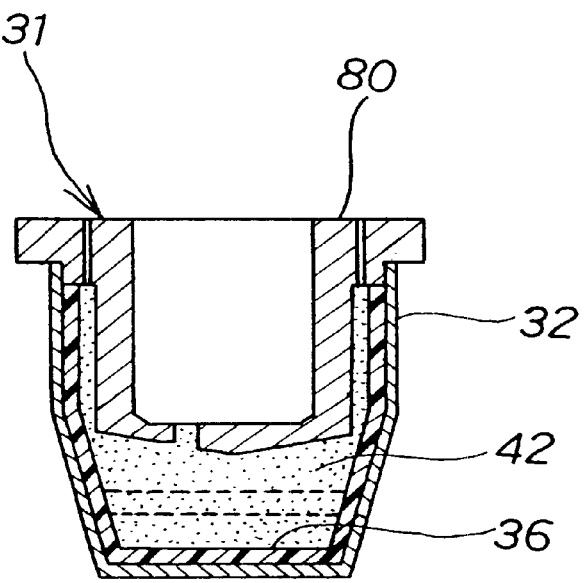

A third preferred embodiment of a fabrication process of a press punch 31 will be described with reference to FIGS. 16A and 16B. FIGS. 16A and 16B illustrate various steps succeeding the steps shown in FIGS. 13A to 13C showing the first preferred embodiment and show the fabrication steps shown in FIGS. 13D and 13E.

In a fabrication step shown in FIG. 16A, the punch forming panel 32 having the backup material 36 is set to a frame body 80. Subsequently, the frame body 80 fixedly supporting the punch forming panel 32 is placed on vibrating springs 85, 85.

The frame body 80 and the punch forming panel 32 are vertically vibrated upward or downward as shown by a white-out arrow. Under these conditions, high strength cement 77 in a slurry form is filled through a supply port 81 into a space 86 defined between the frame body 80 and the punch forming panel 32 (namely, the backup material 36). After this filling step, a plurality of stems 44 are located in given positions to prevent the punch forming panel 32 from being deformed or warped.

The high strength cement 77 in a slurry form is filled into the space 86 and, at the same time, a vacuum pump 88 is driven. By operating the vacuum pump 88, bubbles 77a remaining in the cement 77 is removed by vacuum in the same manner as shown in FIG. 15A.

Owing to evacuating treatment and vibrating treatment, the bubbles 77a is effectively removed from an internal part of the high strength cement 77 into the space 86.

Remaining air in the space 86 is sucked through exhaust ports 82a, 82a and flow passages 89a, 89b, 89c, and is exhausted to outside by the vacuum pump 88 as shown by an arrow.

Since a bottom wall 83 of the frame body 70 has a gentle slope upwardly inclined toward the exhaust ports 82a, 82b, the air remaining in the space 86 is effectively collected. Consequently, the air in the space 86 can be exhausted in a reliable manner.

In a step shown in FIG. 16B, the high strength cement 77 formed in the step shown in FIG. 16A is hardened to form the backup material 42 for the punch forming panel 32, thereby obtaining the press forming punch 31. Thus, the fabrication process of the press forming punch 31 is completed.

In such a press forming punch 31, since the bubble 77a is removed from the high strength cement 77 in a manner as described above with reference to FIG. 16A, there exists no small cavities remained in the backup material. Accordingly, the backup material 42 has an improved durability, thereby increasing the durability of the press forming punch 31.

Figure 17:
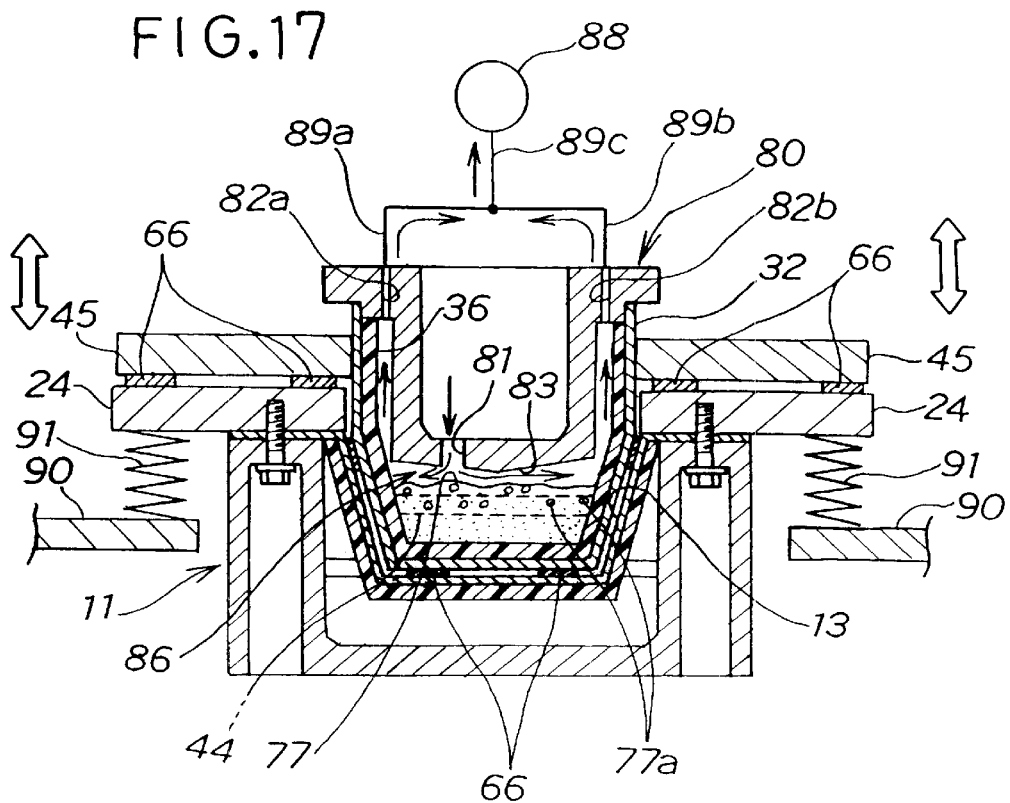
FIG. 17 is a schematic cross sectional view illustrating a fabrication process of a fourth preferred embodiment of a press forming punch according to the present invention.

A fourth preferred embodiment of a fabrication process of a press punch will be described with reference to FIG. 17. FIG. 17 corresponds to FIG. 14B showing the second preferred embodiment.

In a step of FIG. 17, the punch forming panel 32 is placed on the plurality of shim plates 66 provided on the concave die surface 13. Subsequently, the blank holders 45, 45 are placed on the shim plates 66 of the die face member 24, 24, and the frame body 80 is set to the punch panel 32. Then, the blank holders 45, 45 are moved closer to one another to sandwich the punch forming panel 32. In this manner, the punch forming panel 32 and the frame body 80 are maintained in a set position of the press forming die 11.

In a succeeding step, the press forming die 22, in which the punch forming panel 32 and the frame body 80 are set, are placed on vibrating springs 91, 91, by which the press forming die 11, the frame body 80 and the punch forming panel 32 are vertically vibrated upward or downward as shown by a white-out arrow. Under these conditions, a high strength cement in a slurry form is filled through a supply port 81 into a space 86 defined between the frame body 80 and the punch forming panel 32 (namely, the backup material 36).

The high strength cement 77 in a slurry form is filled into the space 86 and, at the same time, a vacuum pump 88 is driven. By operating the vacuum pump 88, bubbles 77a remaining in the cement 77 is removed by vacuum. That is, when the vacuum pump 77 is operated, the space 86 is evacuated and, consequently, the bubbles 77a remaining inside of the high strength cement 77 in the slurry form is sucked by the vacuum pump 88 in the same manner as shown in FIG. 16A. Owing to evacuating treatment and vibrating treatment, the bubbles 77a can be removed from an internal part of the high strength cement 77 into the space 86 in a reliable manner.

Remaining air in the space 86 is sucked through the exhaust ports 82a, 82b, 82c and flow passages 89a, 89b, 89c, and is exhausted to outside by the vacuum pump 88 as shown by an arrow.

Since a bottom wall 83 of the frame body 80 has a gentle slope upwardly inclined toward the exhaust ports 82a, 82b, the air remaining in the space 86 is effectively collected. Consequently, the air in the space 86 can be exhausted in a reliable manner. As a result, the bubbles 77a can be removed from the internal part of the high strength cement 77 in as same manner as shown in FIG. 16A. Consequently, the backup material is prevented from being formed with small cavities, thereby providing an improved durability such that the press forming punch 31 (see FIG. 1) has an improved durability. Further, by setting the punch forming panel 32 and the frame body 80 to the press forming die 11, it is possible to retain the press forming punch 31 in a fixed place in a stable manner, thereby providing ease of filling work of the high strength cement 77.

Although the first preferred embodiment has been shown and described with respect to an example wherein the press forming punch is fabricated after the press forming die is fabricated, the press forming die may be fabricated after the press forming punch is fabricated, or the press forming die and the press forming punch may be concurrently fabricated.

While, in the first preferred embodiment, the fabrication process of the press forming punch illustrated in FIG. 8 has been shown as described with respect to a case wherein the die forming prototype and the punch forming prototype are newly prepared in the ST 20 for the fabricating step of the press forming punch and the shaped panel is newly formed in the ST 21 without utilizing die forming prototype and the punch forming prototype prepared in the ST 10 of the fabrication process of the press forming die discussed with reference to FIG. 2, the die forming prototype and the punch forming prototype prepared in the ST 10 of the fabrication process of the press forming die and the shaped panel formed in the ST 11 may also be utilized.

While, further, the die forming panel and the punch forming panel have been described as being formed by a high tension steel or the stainless steel, the die forming panel and the punch forming panel may be formed of other suitable materials depending on a surface hardness of a final product.

While, in addition, the backup material has been shown and described as being formed of a high strength cement or plastic material, the backup material may be formed of other suitable materials.

While, further, the die forming panel and the punch forming panel has been shown and described as being formed by a two-stage press forming work including a first preliminary press forming operation (see FIGS. 11A, 11B) and a subsequent finish press forming operation, the die forming panel and the punch forming panel may be formed by a single press forming step, that is, the finish press forming operation by omitting the first preliminary press forming step.

While, further, the die forming panel and the punch forming panel has been shown and described with respect to an example wherein the die forming panel and the punch forming panel are press formed by moving the die forming prototype while maintaining the punch forming prototype stationary, each panel may be press formed by moving the punch forming prototype while maintaining the die forming prototype stationary.

While, also, the preferred embodiments have been shown and described with respect to an example wherein the press forming die 11 of the press forming die 10 is arranged to move upward or downward while the press forming punch 31 is held stationary, the press forming punch may be arranged to move upward or downward while the die forming punch is held stationary.

While the press forming die 10 has been described for press forming a fuel tank for two-wheeled automotive vehicle, the press forming die may be utilized for press forming other products (such as an outer panel, an internal panel and bonnet of an automobile, a cover for an alternator, etc.).

While the preferred embodiments have been shown and described as being applied to a hydraulic press machine, the present invention may also be applied to a mechanical press machine. In this event, since the mechanical press machine has an adjusting device, the blocks 57, 57a may be dispensed with.

While, in the illustrated embodiments, the die forming panel and the punch forming panel are press formed by placing a plurality of sheet materials in piles during fabricating operation. For this reason, it is possible to achieve press forming of a plurality of sheet materials in piles by slightly tilting a wall surface of the die forming panel 12 and a wall surface of the punch forming panel.

While it is desired that each of the die forming panel 12 and the punch forming panel 32 has a side wall of a tilt angle of 0 to 60 degrees, the tilt angle may not be restricted within this range.

Obviously, various minor changes and modifications of the present invention are possible in the light of the above teaching. It is therefore to be understood that within the scope of the appended claims, the invention may be practiced otherwise than as specifically described.

What is claimed is:

1. A method for fabricating a press forming die, comprising the steps of:

preparing a die forming prototype and a punch forming prototype;

press forming a first blank material with the die forming prototype and the punch forming prototype to obtain a shaped panel;

fitting the shaped panel into the punch forming prototype again;

placing a second blank material, a resilient sheet and the die forming prototype over the shaped panel fitted to the punch forming prototype in a sequential order;

moving the prototype die toward the punch forming prototype relative to one another and stopping the die forming prototype at a position ahead of a bottom dead point of a press forming machine by a given distance for thereby press forming the second blank material with the shaped panel to obtain a die forming panel; and adding a backup material onto a rear surface of the die forming panel to fabricate the press forming die.

2. A method for fabricating a press forming die, according to claim 1, further comprising the steps of:

mounting the die forming panel onto a frame body after the step of obtaining the die forming panel;

filling a high strength cement in a slurry form into a space between the frame body and the die forming panel; and hardening the high strength cement to form the backup material.

3. A method for fabricating a press forming punch, comprising the steps of:

preparing a die forming prototype and a punch forming prototype;

press forming a first blank material with the die forming prototype and the punch forming prototype to obtain a shaped panel;

fitting the shaped panel into the die forming prototype again;

placing a second blank material, a resilient sheet and the prototype punch over the shaped panel fitted to the die forming prototype in a sequential order;

moving the punch forming prototype toward the die forming prototype relative to one another and stopping the punch forming prototype at a position ahead of a bottom dead point of a press forming machine by a given distance for thereby press forming the second blank material with the shaped panel to obtain a punch forming panel; and adding a backup material onto a rear surface of the punch forming panel to fabricate the press forming punch.

4. A method for fabricating a press forming punch, according to claim 3, further comprising the steps of:

mounting the punch forming panel onto a frame body after the step of obtaining the punch forming panel;

filling a high strength cement in a slurry form into a space between the frame body and the punch forming panel; and hardening the high strength cement to form the backup material.

* * * * *